(12) United States Patent
Isozaki et al.

(10) Patent No.: US 8,892,902 B2
(45) Date of Patent: Nov. 18, 2014

(54) INFORMATION PROCESSING APPARATUS AND INFORMATION PROCESSING METHOD

(75) Inventors: Hiroshi Isozaki, Kawasaki (JP); Kunio Honsawa, Tokyo (JP); Yoshinobu Fujiwara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 60 days.

(21) Appl. No.: 13/179,095

(22) Filed: Jul. 8, 2011

(65) Prior Publication Data

US 2011/0320824 A1    Dec. 29, 2011

Related U.S. Application Data

(63) Continuation of application No. PCT/JP2009/071459, filed on Dec. 24, 2009.

(30) Foreign Application Priority Data

Jan. 9, 2009 (JP) .................................... 2009-3760

(51) Int. Cl.
| | | |
|---|---|---|
| *H04N 7/167* | (2011.01) | |
| *H04N 21/2347* | (2011.01) | |
| *H04N 21/8355* | (2011.01) | |
| *H04N 21/24* | (2011.01) | |
| *H04N 21/442* | (2011.01) | |
| *H04N 21/4367* | (2011.01) | |

(52) U.S. Cl.
CPC ....... *H04N 21/8355* (2013.01); *H04N 21/2347* (2013.01); *H04N 21/24* (2013.01); *H04N 21/44204* (2013.01); *H04N 21/4367* (2013.01)
USPC ........... 713/189; 713/182; 713/183; 713/168; 380/201; 380/255

(58) Field of Classification Search
CPC .................... H04N 21/8355; H04N 21/44204; H04N 21/2347; H04N 21/24; H04N 21/4367
USPC ........... 713/189, 183, 182, 168; 380/201, 255
See application file for complete search history.

(56) References Cited

U.S. PATENT DOCUMENTS

| | | | | |
|---|---|---|---|---|
| 5,634,012 A | * | 5/1997 | Stefik et al. ..................... | 705/39 |
| 6,748,537 B2 | * | 6/2004 | Hughes ......................... | 713/193 |

(Continued)

FOREIGN PATENT DOCUMENTS

| | | |
|---|---|---|
| JP | 2001-118332 | 4/2001 |
| JP | 2004-110817 | 4/2004 |

(Continued)

OTHER PUBLICATIONS

Digital Transmission Content Protection Specification Revision 1.51, Oct. 1, 2007.*

(Continued)

*Primary Examiner* — Saleh Najjar
*Assistant Examiner* — Oleg Korsak
(74) *Attorney, Agent, or Firm* — Oblon, Spivak, McClelland, Maier & Neustadt, L.L.P.

(57) ABSTRACT

An information processing apparatus has a request determining part determining a request type for streaming contents from a communicating apparatus, a copy number managing part managing the number of copies permissible for the communicating apparatus, a stream number managing part managing the number of streams now in communication, a key-selection processing part selecting a first key corresponding to transfer of streaming contents permissible for one or more of copies or a second key corresponding to transfer of streaming contents for copies with generation management restriction or not permissible for copies, an encryption processing part generating encrypted streaming contents using the first or the second key, and a packet processing part generating a packet that includes the encrypted streaming contents and key information selected by the key-selection processing part and to include information on the number of copies to the packet when the first key is selected.

7 Claims, 15 Drawing Sheets

(56) References Cited

U.S. PATENT DOCUMENTS

| | | | |
|---|---|---|---|
| 6,817,535 B2 * | 11/2004 | Epstein | 235/492 |
| 6,859,790 B1 * | 2/2005 | Nonaka et al. | 705/51 |
| 7,295,393 B2 * | 11/2007 | Ichimura | 360/60 |
| 7,308,098 B2 * | 12/2007 | Saito et al. | 380/201 |
| 7,327,935 B2 * | 2/2008 | Yamasaki et al. | 386/252 |
| 7,725,002 B2 * | 5/2010 | Nakajima et al. | 386/326 |
| 8,185,476 B2 * | 5/2012 | Zhu et al. | 705/59 |
| 2004/0078338 A1 | 4/2004 | Ohta et al. | |
| 2004/0267671 A1 | 12/2004 | Nonaka et al. | |
| 2010/0275022 A1 | 10/2010 | Fujiwara et al. | |
| 2010/0275023 A1 | 10/2010 | Fujiwara et al. | |

FOREIGN PATENT DOCUMENTS

| | | |
|---|---|---|
| JP | 2006-51200 | 2/2006 |
| JP | 2008-205554 | 9/2008 |
| JP | 2008-262640 | 10/2008 |
| JP | 2008-310869 | 12/2008 |

OTHER PUBLICATIONS

Bin B. Zhu et al. (A DRM System Supporting What You See Is What You Pay, 2006).*

International Search Report mailed Jan. 26, 2010 in PCT/JP2009/071459 filed Dec. 24, 2009.

ARIB, "Operational Guidelines For Digital Terrestrial Television Broadcasting", ARIB TR-B14, Association of Radio Industries and Businesses, 3 pages.

"Digital Transmission Content Protection Specification vol. 1", Digital Transmission Content Protection Specification Revision 1.51 (Informational Version), Oct. 1, 2007, 41 pages.

"DTCP vol. 1 Supplement E Mapping DTCP to IP", DTCP vol. 1 Supplement E Revision 1.2 (Informational Version), Jun. 15, 2007, 23 pages.

* cited by examiner

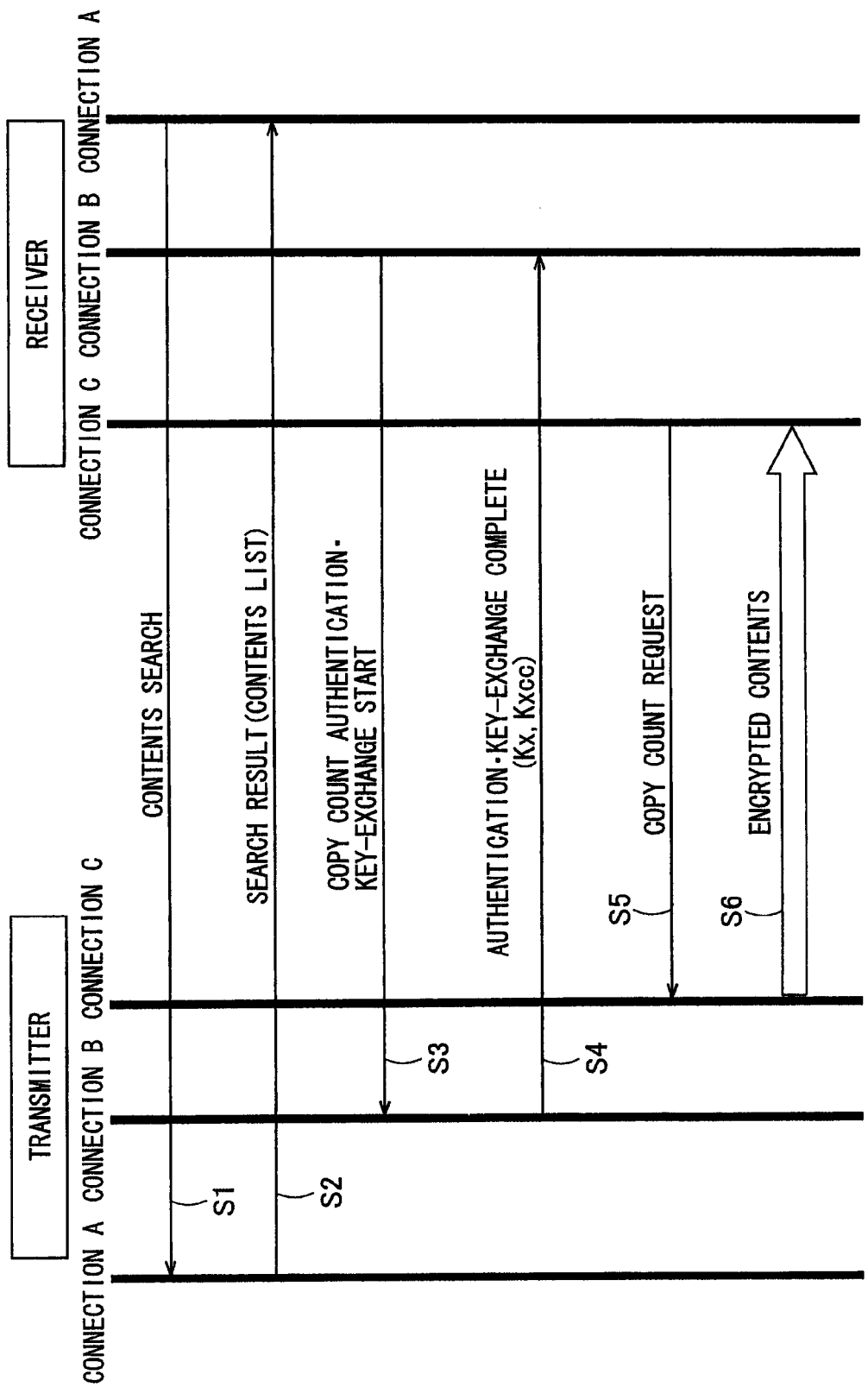

INFORMATION PROCESSING APPARATUS AND INFORMATION PROCESSING METHOD

CROSS REFERENCE TO RELATED APPLICATIONS

This application is based upon and claims the benefit of priority from the prior Japanese Patent Application No. 2009-3760, filed on Jan. 9, 2009, the entire contents of which are incorporated herein by reference.

FIELD

Embodiments relate to copyright protection.

BACKGROUND

With the spread of computer networks such as broadband and wireless LAN, the products called as digital information equipment having a communication function (digital home appliances, hereinafter) have been gradually widespread. Moreover, with the start of terrestrial digital broadcasting and the halt of analog broadcasting, it is predicted that TVs, set-top boxes (STB), DVD recorders, etc., for digital broadcasting will be further widespread in the near future. If a plurality of digital home appliances are connected to a network, users can view or listen to contents via a network, thereby enhancing usability.

Here, contents intend to various types of digital data, i.e. moving-picture data such as MPEG2 or MPEG4, audio data, stream data, text data, still-picture data, etc. Contents composed of these types of data have a feature in that it can be easily copied with no degradation. Therefore, special care is needed for the copyright of contents. For example, a regulation of Japanese digital broadcasting stipulates that a recorder can record contents received via a broadcast wave in internal equipment up to ten times in total. This is commonly called "dubbing 10". Moreover, the current regulation stipulates that when equipments which received a broadcast wave output streaming contents to a network, "the number of streams to be simultaneously output be less than eight for each receiver" with respect to transmission of generation management information.

Incidentally, various proposals have been made in order to protect copyright of contents and enhance usability of contents.

As described above, according to the current regulation, equipment for receiving Japanese digital broadcasting can record streams in internal equipment up to ten times and output eight streams at the maximum to a network. Under the current regulation, if it is supposed to store eight streams output to a network in each of separated recording apparatuses, eight copies can be made, and the number of copies made in the equipment which received Japanese digital broadcasting under the regulation of dubbing 10 is added. As a result, 18 copies can be made in total at the equipment itself and the other equipment. As described above, under the current regulation, users cannot freely make 18 copies. More specifically there is a restriction on the storage place in that 10 copies at the maximum are permitted for the user's equipment and eight copies at the maximum are permitted for the other equipment. In this way, usability under the current regulation is not sufficient.

BRIEF DESCRIPTION OF THE DRAWINGS

FIG. 5 is a sequence diagram showing process steps of the contents transfer system according to the present embodiment;

DETAILED DESCRIPTION

Figure 1:
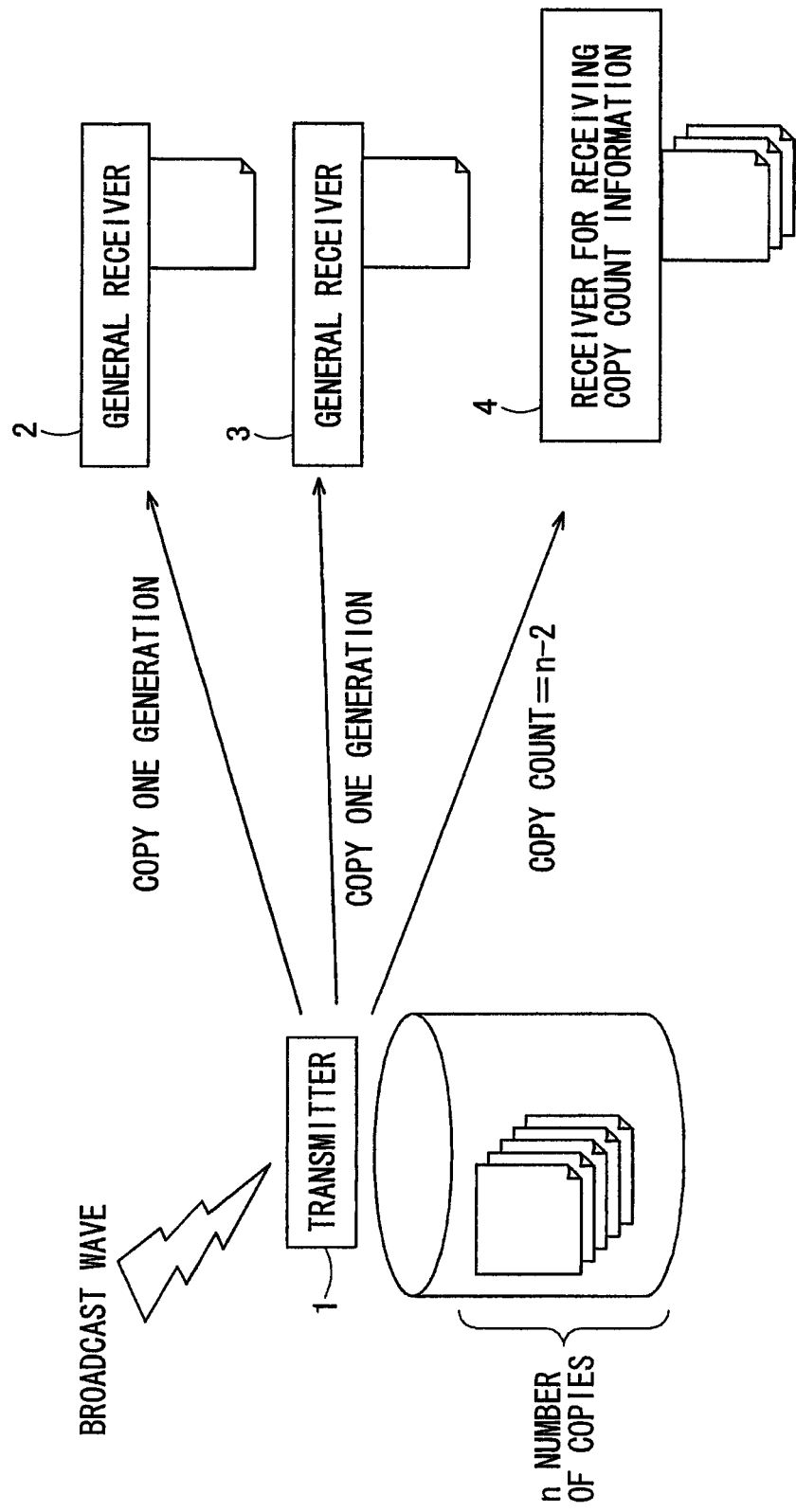
FIG. 1 is a conceptual view for a case where a transmitter 1 transmits information related to a copy allowable number and another case where it dose not transmit such information.

According to one aspect of the present embodiment, an information processing apparatus comprises:

a key transmitting part configured to encrypt a first key and a second key by using a common key and to transmit the common key to a communication apparatus, the common key being generated by performing authentication key exchange process with the communication apparatus, the first key having a value unique to the communication apparatus, the second key having a value common to a plurality of communication apparatuses;

a key label transmitting part configured to transmit a first key information corresponding to the first key and a second key information corresponding to the second key;

a request determining part configured to determine a request type for streaming contents from a communicating apparatus;

a copy number managing part configured to manage the number of copies permissible for the communicating apparatus if it is determined that the communicating apparatus has requested by using the first key information, reception of contents encrypted by the first key;

a key-selection processing part configured to select the first key corresponding to transfer of streaming contents permissible for one or more of copies and the second key corresponding to transfer of streaming contents for copies with generation management restriction or not permissible for copies, based on a result of determination of the request determining part;

an encryption processing part configured to generate encrypted streaming contents using the first or the second key; and a packet processing part configured to generate a stream which includes plain text key information selected by the key-selection processing part and plain text information on the number of copies if the key-selection processing part has selected the first key and encrypted contents.

Embodiments of an information processing apparatus, an information processing method, and an information processing program will now be explained with reference to the accompanying drawings. Before explaining concrete embodiments, the conception of the embodiments will be explained.

DTCP, DTCP-IP and the like have been widespread as a technique to output contents to a home network while protecting the copyright of the contents. These techniques are referred to as DTCP-IP hereinafter.

However, DTCP-IP has only a function of notifying generation management information (copy control information) such as Copy One Generation (copying one generation only allowable). Therefore, it is impossible to notify an allowable copy number that indicates how many copies are allowable from a transmitter to a receiver. That is, when the receiver connected to a network receives contents with generation management information of Copy One Generation from the transmitter, the receiver can record the contents only once as a general rule.

In general, when contents that can be copied a plurality of times are stored in the equipment, the contents are stored only one in the equipment. The allowable number of copies is controlled by management data of the contents. As an example, it is considered that one contents is transmitted by "move" to the receiver from the transmitter having the right of making a plurality of copies. In this case the transmitter has management data, in advance, concerning how many copies are allowed to be made. Therefore, the transmitter controls the number of allowable copies by updating the management data when performing "move". Here, "move" means that the transmitter transfers contents to the receiver, the transmitter erases the transmitted contents, and the receiver makes one copy of the received contents.

Considered next is that the transmitter transmits several numbers of copies to the receiver via the network. When the transmitter has contents allowable for a plurality of copies, one of a technique to transfer the same contents multiple times from the transmitter to the receiver is performing "move" to the same contents multiple times. That is, it means that the transmitter decreases the copy allowable times one by one every time the contents are moved once. However, in this case, since one contents is repeatedly transmitted and received, a long transfer time is required for the transmission. In order to determine whether a plurality of contents received by the repetition of "move" are the same contents or different contents, the receiver has to check not only the capacity but also whether the files of the contents are identical to one another one byte by one byte. However, it is practically difficult to determine whether the contents are identical to one another. Even if the same contents are received repeatedly by "move", the entire contents cannot be managed by management data, and therefore, each contents have to be dealt with as a individual contents. Therefore, the receiver requires storage capacity for the number of transfer. Accordingly, if the transmitter can output contents with management data indicative of the number of allowable copies to the receiver, the receiver that receives the contents can record the contents for the allowable number indicated by the management data. This is useful for users.

This is very advantageous particularly in the case where an apparatus for receiving broadcast waves does not have a recording function, the received stream contents are directly transmitted to a home network, and an apparatus connected to the network has a recording function.

FIG. 1 is a conceptual view for a case where a transmitter 1 transmits information related to a copy allowable number and another case where it dose not transmit such information. Suppose that the transmitter 1 for receiving broadcast waves receives streaming contents that are available for copies up to n times. In this case, if the transmitter 1 has a recording part, the transmitter 1 can store an n pieces of contents into the recording part. However, if the transmitter 1 does not have a recording part, the transmitter 1 has to transmit contents of Copy One Generation to each of n number of receivers via a network. This is a known technique. In this case, the n number of receivers cannot make additional new copies.

In contrast, if the transmitter 1 can transmit management data that specifies a copy allowable number Copy Count to the receiver, the receiver can generate duplicates for the specified limited number. Accordingly, the transmitter 1 has no need to transmit contents with a plurality of streams, thereby enhancing usability.

For example, in the case of FIG. 1, contents of Copy One Generation have already been transmitted to two receivers 2 and 3. Therefore, the contents that can be copied at the maximum n times, can make the remaining (n−2) number of copies. In this case, the transmitter 1 transmits contents with management data (Copy Count information) that specifies (n−2) as an allowable number of copies to a receiver 4.

Here, the following two factors are important.
(1) Contents have to be transmitted with protection so that a Copy Count value can not altered on a transmission line of a network.
(2) A transmitter and a receiver have to correctly manage the number of copies.

The factor (1) requires a specific mechanism for protecting contents so that the contents are not illegally copied on the transmission line. A known technique for protecting contents from illegal copy is an authentication process between the transmitter and the receiver to share a key that is used for encrypting the contents for transfer. With this technique, when performing multicast or broadcast for distributing the same contents from the transmitter to a plurality of receivers, it is suitable to encrypt the content with the same key to the receivers in view of communication efficiency. Because of this, the receivers have to share the same key.

However, if the transmitter delivers the same key to a plurality of receivers when transferring copy-allowable-number information, the receivers can decrypt contents with the copy-allowable-number information. It is therefore possible to make copies for the number obtained by multiplying the number of receivers that have received the key by the copy allowable number. This exceeds the copy allowable number originally intended by the transmitter 1, resulting in insufficient copyright protection of the contents.

In order to solve this problem, there is a conventional technique in which the transmitter distributes a separate key to each receiver. For example, a common key shared by a plurality of receivers and move keys delivered to the respective receivers are defined, and the move keys are used for performing "move" to contents. However, it is not considered in the conventional technique at all that the transmitter manages the copy allowable number for contents, transmits a Copy Count value, etc.

The embodiments which will be described below in detail are characterized in that the factors (1) and (2) discussed are guaranteed.

FIRST EMBODIMENT

Figure 2:
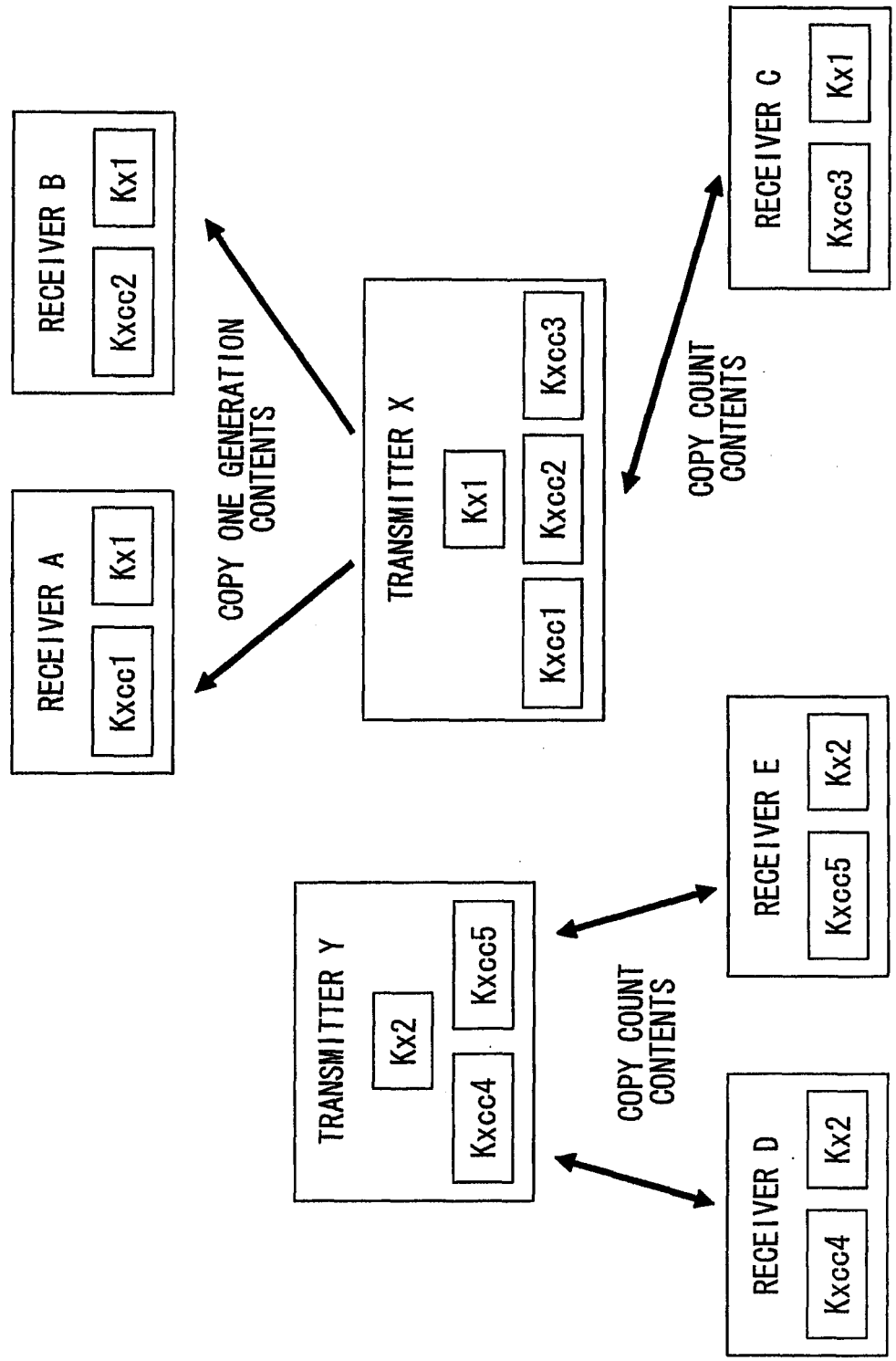
FIG. 2 is a conceptual view of a contents transfer system having a transmitter and a receiver according to a first embodiment.

FIG. 2 is a conceptual view of a contents transfer system having a contents transmitter (referred to merely as a transmitter, hereinafter) and a contents receiver (referred to merely as a receiver, hereinafter) according to a first embodiment. FIG. 2 shows that transmitters and receivers share a common key Kx for use in encrypting contents and Copy Count key (CC key, hereinafter) Kxcc for use in encrypting contents which indicate allowable number Copy Count for the contents.

As long as there is no particular explanation, a transmitter for transmitting a live streaming contents acquired by receiving a broadcast wave to a network will be explained hereinafter. Here, the live streaming contents are the contents which does not have a storage function except for temporary storage such as a buffering, but which directly outputs the received broadcast wave to outside.

Transmitters X and Y of FIG. 2 use a common key Kx for transmitting generation management information and a CC key Kxcc for transmitting contents which indicate a copy allowable number. The transmitter X and Y distribute their own common keys Kx of the same value to a plurality of receivers. The common key Kx is provided only one for each transmitter. A common key Kx1 of the transmitter X and a common key Kx2 of the transmitter Y are different from each other. The CC key Kxcc is different among the respective receivers. There are CC keys Kxcc1 to Kxcc5 in FIG. 2. In this specification, as general term, the common keys Kx1 and Kx2 and the like are referred to as a common key Kx and the CC keys Kxcc1 to Kxcc5 are referred to as a CC key Kxcc.

In a model of multicast for simultaneously distributing the same contents to a plurality of receivers from a transmitter or a model of broadcast, it is preferable to encrypt the contents with the same key in view of communication efficiency. Accordingly, each of the transmitters X and Y transmits the same common key Kx to a plurality of receivers.

In contrast, for the CC key Kxcc, since each receiver that receives contents from the transmitter manages the number of copies, the transmitter prepares the CC keys Kxcc1 to Kxcc5 different among the respective receiver and transmits a CC key Kxcc to each receiver, together with contents.

As described later, both of the common key Kx and the CC key Kxcc are generated by the transmitter using a random number generating apparatus (not shown). Therefore, the keys Kx and Kxcc are different for each transmitter.

In the example of FIG. 2, the transmitter X transmits the same common key Kx1 to receivers A, B and C, and transmits the CC keys xcc1, xcc2 and xcc3 to the receivers A, B and C, respectively. The transmitter Y transmits the same common key Kx2 to receivers D and E, and transmits the CC keys xcc4 and xcc5 to the receivers D and E, respectively.

Figure 3:
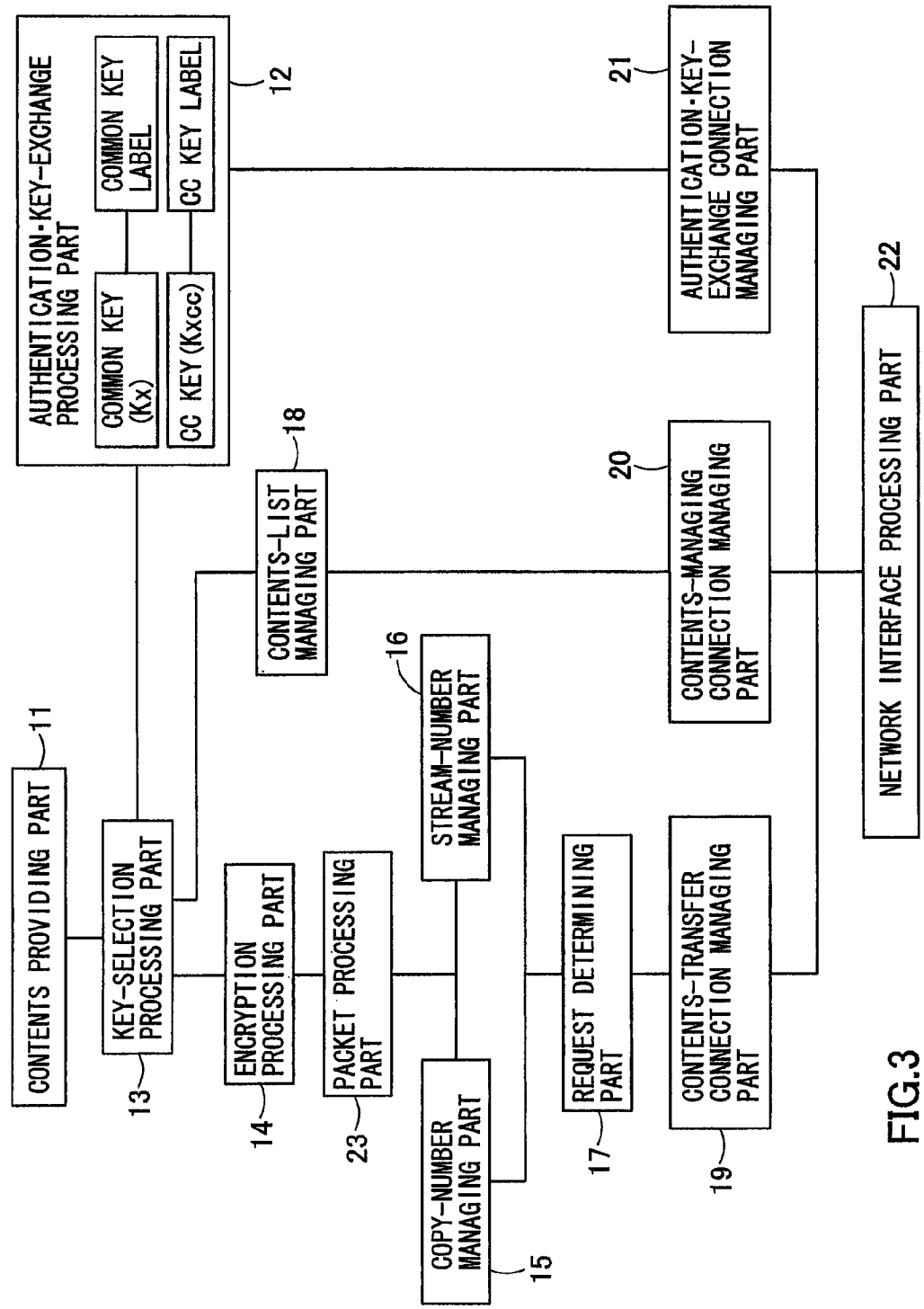
FIG. 3 is block diagram showing an example of the internal configuration of transmitters X and Y of FIG. 2.

FIG. 3 is block diagram showing an example of the internal configuration of transmitters X and Y of FIG. 2. As shown in FIG. 3, the transmitter has a contents providing part 11, an authentication•key-exchange processing part 12, a key-selection processing part 13, an encryption processing part 14, a copy-number managing part 15, a stream-number managing part 16, a request determining part 17, a contents-list managing part 18, a contents-transfer connection managing part 19, contents-managing connection managing part 20, an authentication•key-exchange connection managing part 21, a network interface processing part 22, and a packet processing part 23.

The contents providing part 11 provides the key-selection processing part 13 with contents of an unencrypted plain text.

The authentication•key-exchange processing part 12 performs an authentication•key-exchange process with the receiver. When succeeding in the authentication•key-exchange process, the authentication•key-exchange processing part 12 generates a CC key Kxcc for use in encryption of contents allowable for a plurality of copies and a common key Kx for use in encryption of contents allowable for one copy or not allowable for copy by using a random number generator (not shown). Then, the authentication•key-exchange processing part 12 uses the common key obtained by key-exchange with the receiver which has succeeded to the authentication•key-exchange process, and encrypts the common key Kx and CC key Kcc to generate an encrypted-key data which is then transmitted to the receiver.

It may be considered that the receiver receives common keys Kx and CC keys Kxcc from a plurality of transmitters. In this case, in order to distinguish from which transmitters the keys are received, each transmitter may transmit encrypted-key data to the receiver, together with a common-key label, a CC-key label or the like as an identifier. Since this identifier itself has no secrecy, it may be added to the encrypted-key data without encryption. As an encryption algorism for generating or deciphering the encrypted keys described above, a known technique such as AES (Advanced Encryption Standard) can be used, with no limitation.

Here, the authentication•key-exchange process performed by the authentication•key-exchange processing part 12 is a process of bilaterally authenticating the transmitter, the receiver and the like as the apparatus correctly licensed by a licensing organization and generating a common key if it is confirmed that the apparatus is an authenticated one. As a technique for authentication, a known technique such as ISO/IEC 9798-3 or ISO/IEC 9798-2 may be used, with no limitation.

The key-selection processing part 13 performs a process of determining whether to encrypt contents with a common key (Kx) or a CC key Kxcc (Kxcc being written as a CC key, hereinafter) in response to a contents request from the receiver, and selects a proper key among the common keys exchanged between the authentication•key-exchange processing part 12 and the receiver and provides the encryption processing part 14 with the proper key.

The encryption processing part 14 encrypts contents with a key selected by the key-selection processing part 13. As an encryption algorism for encrypting and deciphering these data, a known technique such as AES may be used, with no limitation.

The copy-number managing part 15 counts the total number of copies now in transmission for each contents allowable for copy.

The stream-number managing part 16 counts the number of streams now in communication with the receiver and rejects a connection establishing request for contents transmission if the number reaches to a predetermined upper limit. Here, connection indicates a range capable of communicating with one protocol of TCP/IP.

The request determining part 17 determines for what type of copy the receiver has performed a contents transmission request.

Here, the types of copy are distinguished with copy control information. Copy control information (CCI) includes Copy One Generation (COG: copying one generation only allowable), No More Copies (NMC: copy unallowable), Copy Never (CN: copy unallowable), Copy Free (CF: copy allowable without encryption), EPN (Encryption Plus Non-assertion: Internet retransmission prohibited), etc. Copy Never indicates a mode of copy prohibited before transmitted to a network. No More Copies indicates Copy One Generation contents that is recorded once and output. EPN indicates contents that have no limitation on the number of copy, generation, etc. but that is prohibited to be retransmitted to the Internet. Therefore, if the receiver receives contents added with copy control information that is Copy One Generation, Copy Free or EPN, it is allowed to record the contents. On the contrary, if the receiver receives contents added with copy control information that is Copy Never or No More Copies, rendering (image output) is permitted but recording is not. In this application, copy control information is newly added with Copy Count information (a copy allowable number notified to the receiver). In the embodiments, among the copy control information, Copy One Generation, No More Copies, Copy Never, Copy Free, and EPN are referred to as generation management information.

The contents-list managing part 18 manages a contents list that can be provided by the contents providing part 11 and provides the receiver with an available contents list in response to a contents search request from the receiver.

The contents-transfer connection managing part 19 manages a connection for contents transmission.

The contents-managing connection managing part 20 manages a connection for providing the receiver with the contents list, a URL of contents, etc. As a method of providing the receiver with the contents list, a protocol such as UPnP (Universal Plug and Play) may be used. As for a means indicative of the location of contents, URL (Universal Resource Locator), URI (Universal Resource Identifier) or the like may be used.

The authentication•key-exchange connection managing part 21 manages a connection for authentication•key-exchange with the receiver.

The packet processing part 23 adds header information which will be described later, to encrypted contents generated by the encryption processing part 14, to form them into a specific format, resulting in generating a packet.

Figure 4:
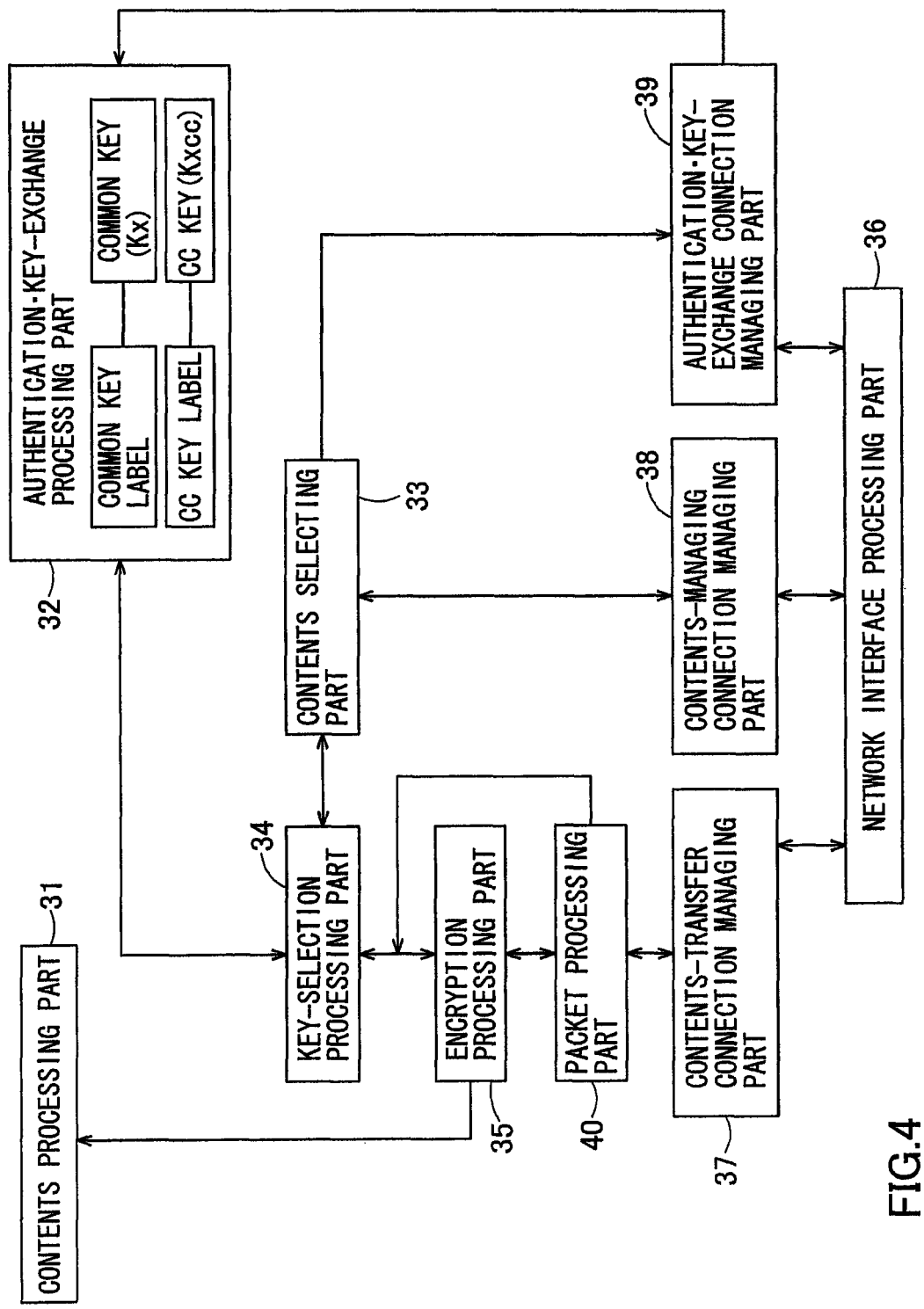
FIG. 4 is block diagram showing an example of the internal configuration of a receiver.

FIG. 4 is block diagram showing an example of the internal configuration of the receiver. As shown in FIG. 4, the receiver has a contents processing part 31, an authentication•key-exchange processing part 32, a contents selecting part 33, a key-selection processing part 34, an encryption processing part 35, a network interface processing part 36, a contents-transfer connection managing part 37, a contents-managing connection managing part 38, an authentication•key-exchange connection managing part 39, and a packet processing part 40.

Each of the network interface processing part 36, the contents-transfer connection managing part 37, the contents-managing connection managing part 38, and the authentication•key-exchange connection managing part 39 has have the same functions as the corresponding part in the transmitter. Therefore, a detailed explanation thereof will be omitted hereinbelow.

The contents processing part 31 performs processes such as the output of the received contents to a display apparatus and the store of the received contents into a storage part (not shown).

The authentications key-exchange processing part 32 performs an authentications key-exchange process with the transmitter. When succeeding in the authentication•key-exchange process, the authentication•key-exchange processing part 32 receives a common key Kx and a CC key Kxcc for decrypting contents from the transmitter and stores them with labels (identification information).

The contents selecting part 33 communicates with the transmitter to search for contents that can be provided by the contents providing part 11 in the transmitter and manages a list of search result and the location of each contents on a network. As a means for acquiring a list available by the transmitter from the transmitter or equipment on a network, for example, UPnP is used. As for a means for specifying the location of contents on a network, for example, a URL or URI is used.

Two cases are considered as cases for receiving the same contents. One case is to merely perform rendering (displaying) at the receiver. The other case is to make copies in a range of a copy allowable number and to store them. If rendering is a purpose, the transmitter encrypts contents with a common key Kx. If notification of a copy allowable number is a purpose, the transmitter encrypts contents with a CC key Kxcc. As a manner of notifying the transmitter for which purpose the receiver wants to receive contents, for example, there is a scheme in which the transmitter provides the receiver with two URLs for providing the same contents so that the receiver can select either of the two URLs depending on the purpose that is rendering or copying. As a manner other than the manner described above, information for notifying the transmitter of for which purpose the receiver wants to receive contents may be added to an HTTP Request Header, a URL and the like when the receiver requests contents by HTTP GET Method.

The key-selection processing part 34 determines whether a contents request from the contents selecting part 33 is a request for contents with a copy allowable number or request for contents with generation management information. If the contents request is the request for contents with a copy allowable number, the key-selection processing part 34 identifies a CC key as to which transmitter provides the CC key and transmits request for contents added with a CC key label corresponding to the CC key to the transmitter. If the contents request is a rendering request, the key-selection processing part 34 transmits a contents request to the transmitter, with no attachments.

As described above, when contents are delivered by the transmitter, the corresponding URL is acquired by the contents selecting part 33, and the key-selection processing part 34 transmits a GET request, for example, by HTTP to the URL and acquires contents from the transmitter.

The encryption processing part 35 decrypts contents using a common key Kx or a CC key Kxcc. The packet processing part 40 extracts information required for decrypting contents from a packet transmitted from the transmitter and delivers it to the key-selection processing part 34, or divides the packet into encrypted data and unencrypted data, etc. and then delivers the encrypted data to the encryption processing part 35.

FIG. 5 is a sequence diagram showing process steps of the contents transfer system according to the present embodiment. In the present embodiment, three connections A, B and C are provided between the transmitter and the receiver. The connection A is used for contents management. The connection B is used for authentication and key exchange. The connection C is used for contents transfer.

Firstly, the receiver makes a request to the transmitter for contents search using the connection A (step S1). Before this contents search, search for an IP address of the transmitter on a network, or identification of the IP address or a port number of a destination of transmitting the message for searching for contents is performed by using a known technique such as UPnP.

The transmitter indicates a contents list and a URL of the contents (step S2).

As protocol for contents search, a technique defined by UPnP Content Directory Service (UPnP CDS) may be used. As additional information to the URL that indicates the location of contents, the IP address and the TCP port number of the transmitter may be added, which are used for authentication and key exchange between the receiver and the transmitter. Moreover, when the transmitter provides the receiver with a contents list, an address (URL) for copy permission using a CC key and an address (URL) for conventional generation management (such as Copy One Generation and Copy Never) regarding the same contents are separately listed in the contents list. A scheme for distinguishing between the address (URL) for copy permission using the CC key and the address (URL) for generation management may be (a) a scheme for adding additional information indicating Copy Count usage to an address of contents and (b) a scheme for attaching a CC-key label to an address of contents.

The receiver selects desired contents in the contents list. It is supposed here that the receiver has selected a URL for receiving contents for the purpose of copying. The receiver acquires an address and a port number of the transmitter, with which an authentication•key-exchange process is to be performed, from the additional information of the URL that indicates the location of contents, and requests the transmitter to start the authentication•key-exchange process for acquiring a CC key Kxcc by using the connection B (step S3).

When the authentication•key-exchange process is succeeded, the transmitter generates a common key Kx and a CC key Kxcc that are secret keys for encrypting contents between the transmitter and each receiver by using a random number generator (not shown), encrypts the contents with a temporary key shared in authentication and key exchange, and then transmits the common key Kx and the CC key Kxcc to each receiver, together with label information (step S4).

If it is confirmed by authentication and key exchange that the receiver is the same apparatus with which authentication and key exchange has been performed previously, the same CC key Kxcc may be transmitted. It is, however, important that the same CC key Kxcc as the CC key transmitted to another receiver is not delivered to a different receiver. Accordingly, it is guaranteed that contents encrypted with the CC key Kxcc can be decrypted by only one receiver.

Suppose, for example, that the transmitter X shown in FIG. 2 transmits a CC key Kxcc1 for permitting three copies of contents (Copy Count=3) to the receiver A and transmits a CC key Kxcc2 for permitting five copies of contents (Copy Count=5) to the receiver B. The transmitter X encrypts the contents for the receiver A by using the CC key Kxcc1 transmitted to the receiver A and encrypts the contents for the receiver B by using the CC key Kxcc2 transmitted to the receiver B. Accordingly, even if the receiver A illegally receives a stream of Copy Count=5, since the transmitter A does not have the CC key xcc2, it cannot decrypt the contents of Copy Count=5. Therefore, the transmitter can transmit contents for the expected copy allowable number to each receiver. In addition, the transmitter can simultaneously receive a request for copy allowable contents from a plurality of different receivers. Both of security and user friendliness can be improved.

In step S4 of FIG. 5, after the completion of the authentication•key-exchange process is notified, the transmitter transmits the common key Kx and the CC key Kxcc to the receiver, together with label information. Here, the label information includes a CC-key label. The CC-key label is a label (identification information) that is paired with a CC key generated by the transmitter. The CC-key label is used, when the transmitter (for example, the transmitter X of FIG. 2) has a plurality of CC keys (for example, Kxcc1, Kxcc2, and Kxcc3), for distinguishing between the CC keys and for determining at the receiver which CC key can be used for decrypting encrypted contents when a plurality of transmitters transmit the contents with Copy Count. The CC key is encrypted with a key shared in an authentication•key-exchange process. In contrast, the CC-key label may not be encrypted and transmitted to a network because it has no secret value.

When the receiver receives a CC key Kxcc and a CC-key label, it transmits a contents request with copy allowable number restriction to the transmitter using the connection C (step S5). The contents request with copy allowable number restriction includes a CC-key label with which the receiver can receive the encrypted contents. The CC-key label may be sent as a tag in HTTP Response Header, for example.

The transmitter confirms the CC-key label included in a contents request with copy allowable number restriction to determine which CC key is to be used for encrypting contents and encrypts the contents with the CC key that matches the CC-key label and transmits the encrypted contents to the receiver (step S6).

Figure 6A:
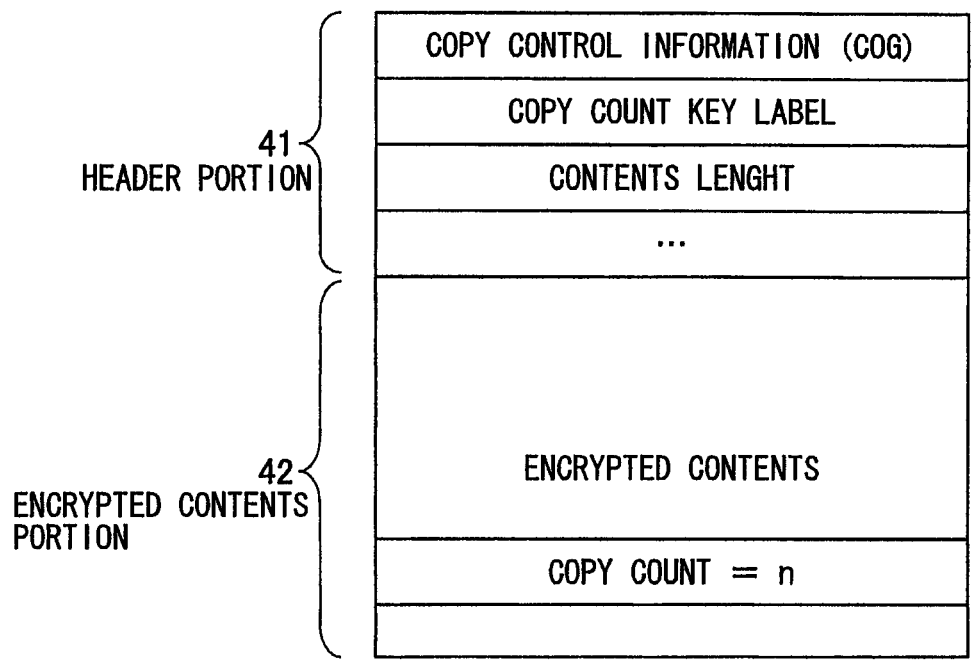
FIG. 6A is a view showing an example of a format of a packet in contents transfer.

FIG. 6A is a view showing an example of a format of a packet in contents transfer. The packet includes a header portion 41 and an encrypted contents portion 42. The header portion 41 includes copy control information, a CC-key label, and a contents length. The encrypted contents portion 42 is made by encrypting streaming contents and Copy Count information. In addition, Move flag information may be included in the encrypted contents portion 42. A technique for multiplexing these information may be a known technique such as MPEG-TS, DVD-VR (DVD Video Recording) format, etc.

As described above, copy control information (CCI) includes Copy Count information in addition to generation management information such as One Generation (copying one generation only allowable), No More Copies (copy unallowable), Copy Never (copy unallowable), Copy Free (copy allowable without encryption), EPN (Encryption Plus Non-assertion), etc. The receiver determines whether recording is allowable based on the copy control information. For example, contents may be stored in the case of Copy One Generation or Copy Free whereas may not be stored in the case of Copy Never or No More Copies. The copy control information is included in a portion of calculation of an encryption key to be used in encryption of streaming contents so that the contents can not be illegally altered while being transferred over a network. An example of a method of calculating a contents encryption key is shown below.

Contents encryption key=$f$(CC key, copy control information)       (1)

Here, a function f is to encrypt copy control information with a CC key. A known technique such as AES may be used.

A random number may be added in addition to copy control information, as an argument of the function f.

By using an encryption key calculated with the equation (1), data composed by multiplexing streaming contents and Copy Count information is encrypted to generate encrypted contents.

The contents length included in the header portion 41 of FIG. 6A indicates the entire length of encrypted contents. The transmitter inserts Copy Count information and Move flag information in contents before encryption according to need, multiplexes them, and then encrypts them.

Move flag information indicates whether to transfer contents by "move". In the present embodiment, it is presupposed that the transmitter does not have a storage function. Therefore, the transmitter transmits contents with "off" of Move information.

Copy Count information indicates how many copies are allowable to the receiver. The receiver can confirm the value of Copy Count information included in the received packet and make copies for the number equal to or less than the value.

Figure 6B:
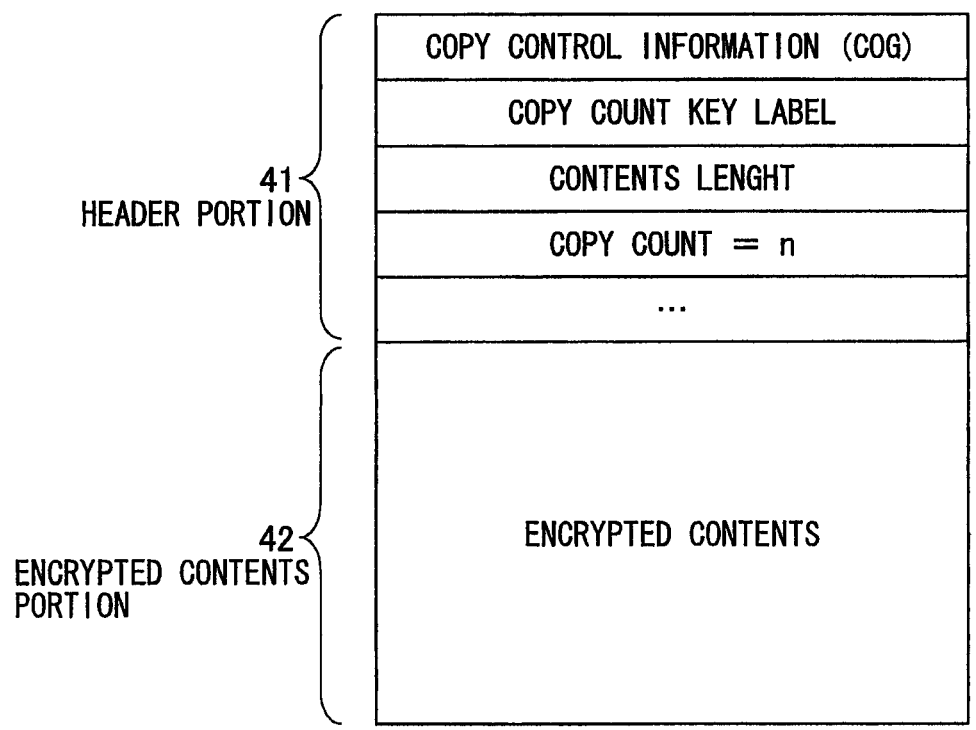
FIG. 6B is a view showing an example of a format of a packet in which Copy Count information is included in a header portion 41.

Explained with reference to FIG. 6A is the example in which Copy Count information is included in the encrypted contents portion 42. However, as shown in FIG. 6B, a contents encryption key may be generated using Copy Count information included in a header portion. A calculation method for a contents encryption key in this case is expressed, for example, as an equation (2) shown below.

$$\text{Contents encryption key}=f(CC \text{ key, copy control information, Copy Count information})) \quad (2)$$

When the transmitter inserts Copy Count information into contents, copy control information is Copy One Generation (COG). The reason is explained below with reference to FIG. 7.

Figure 7:
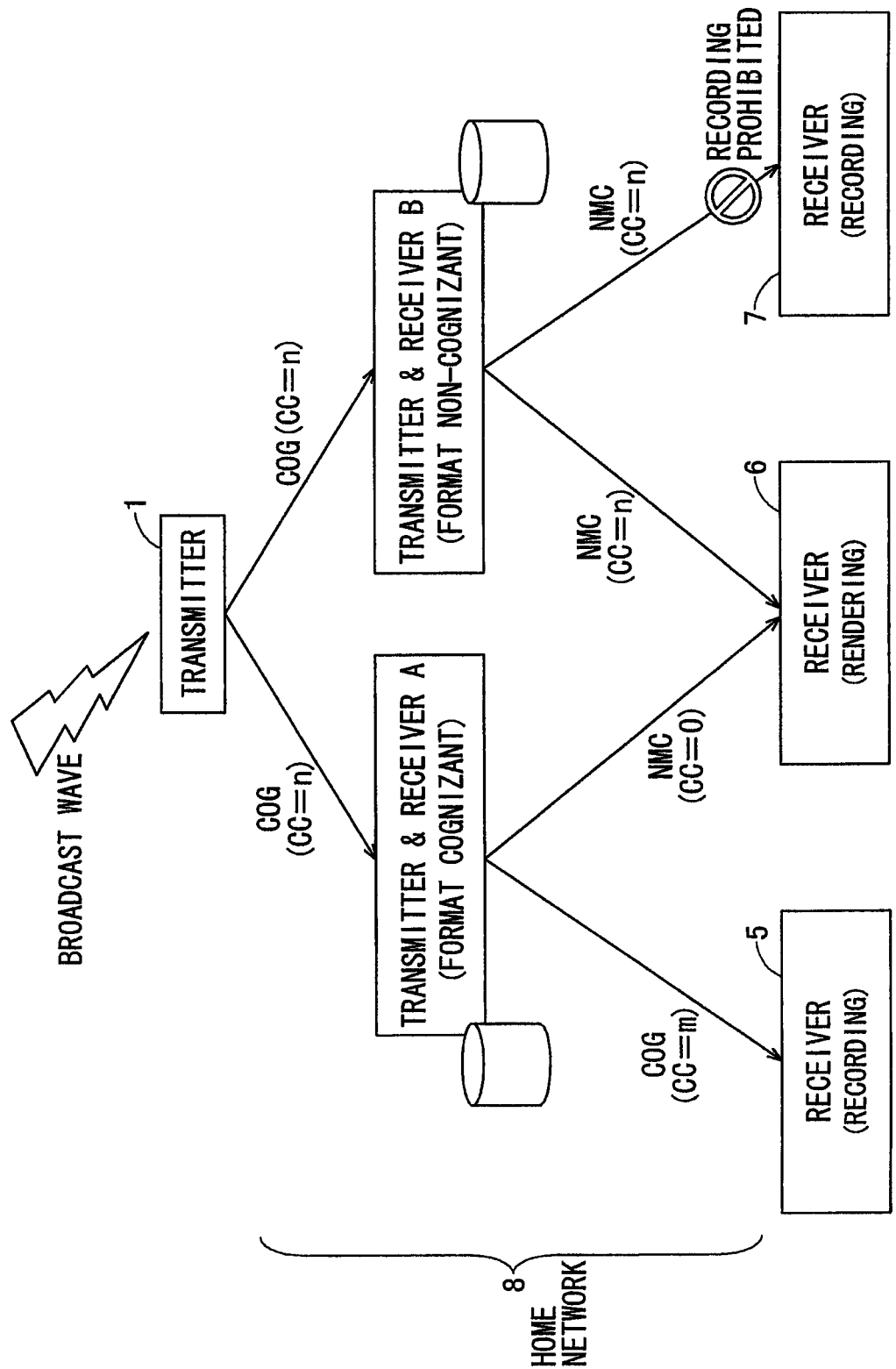
FIG. 7 is a view showing an example in which a transmitter 1 that has received a broadcast wave retransmits streaming contents to a plurality of receiver via a home network 8.

FIG. 7 is a view showing an example in which the transmitter 1 that has received a broadcast wave retransmits streaming contents to a plurality of receiver via a home network 8. Connected to the home network 8 of FIG. 7 are the transmitter 1 that receives a broadcast wave, transmitter&receivers A and B that receive the streaming contents retransmitted by the transmitter 1, and receivers 5 to 7 that receive the streaming contents retransmitted by the transmitter&receivers A and B.

In FIG. 7, the transmitter 1 transmits streaming contents acquired by receiving a broadcast wave to the home network 8 and stores the contents in the receiver (the transmitter&receivers A and B in FIG. 7) having a different function from the transmitter 1. Thereafter, the receiver (the transmitter&receivers A and B) retransmits the contents to another apparatus (the receivers 5 to 7). FIG. 7 shows such a scene of use.

The transmitter&receiver is divided into two types. One is an apparatus having a function of interpreting information multiplexed into contents (Format Cognizant function). The other is an apparatus capable of interpreting the header portion 4 without a function of interpreting information multiplexed into contents (having a Format Non-cognizant function).

Here, it is considered that the transmitter 1 transmits contents to the transmitter&receiver A having the Format Cognizant function and the transmitter&receiver B having the Format Non-cognizant function. It is supposed as an example that the transmitter 1 has given permission for an N number of copies to the transmitter&receivers A and B.

Considered first is that the receiver A receives contents from the transmitter 1. The transmitter&receiver A reads Copy Count information multiplexed into contents and makes an N number of copies. Also considered is an example that an M (N>M) number of contents undergo "move" to a receiver. This case is realized for the transmitter&receiver A to set copy control information to Copy One Generation and transmit contents to the receiver 5 with Copy Count=M. In the case of transmitting contents to the receiver 6 having a purpose of rendering (display only with no storage), copy control information is set to No More Copies.

Considered next is that the transmitter&receiver B receives contents from the transmitter 1. Since the transmitter&receiver B cannot read Copy Count information multiplexed into the contents, it interprets the contents as general Copy One Generation contents. Therefore, although Copy Count=N is included in the contents, the transmitter&receiver B is capable of interpreting the header portion 41 only, and since the header portion has been set to Copy One Generation, the transmitter&receiver B makes only one copy of the contents. The transmitter&receiver B cannot read Copy Count information multiplexed into the contents, and hence the value of Copy Count is not altered even in retransmission. When the transmitter&receiver B transmits contents to the receiver 6 having a purpose of rendering, the receiver 6 does not have a storage function in the first place, thus no particular problem being occurred. Moreover, even if a receiver has a storage function (the receiver 7), the receiver 7 cannot record contents due to the copy control information set to No More Copies. That is, when the receiver 7 determines whether received contents are allowable for recording, even if the receiver 7 has the Format Cognizant function to interpret Copy Count information multiplexed into the contents, generation management information (Copy One Generation) in the header portion 41 is given priority over Copy Count information. Therefore, the receiver 7 does not record the contents irrespective of the value of Copy Count information because the contents received from the transmitter&receiver B have been set to No More Copies.

This is also applied to the case where copy control information is set to "move". It is also considered that the transmitter 1 transmits streaming contents with Copy Count information multiplexed into the contents at N, and with "move" to copy control information. In this case, the transmitter 1 is considered to store the contents once even though it does not have a storage function. The contents are virtually stored once in the transmitter 1 and hence is in the mode of No More Copies. When the transmitter 1 outputs the contents as it is to the transmitter&receiver B, copy control information of the header portion 41 is inevitably set to No More Copies, resulting in that the transmitter&receiver B cannot store the contents. Therefore, in order for the transmitter&receivers A and B to store the contents, the transmitter 1 transmits the contents with copy control information set to "move". Since copy control information is set to "move", the transmitter 1 has to delete contents for the number specified by Copy Count information conceptually. In this case, however, the transmitter 1 has not stored the streaming contents received via a broadcast wave. Therefore, no contents to be deleted exists, and hence it is substantially enough to control a Copy Count number so that the number does not exceed the upper limit. In contrast, the transmitter&receivers A and B can record the received contents due to copy control information set to "move" and also can handle the Copy Count information as it is.

In the case where copy control information at "move" is applied to the streaming contents, and the streaming contents are transferred with Copy Count information, since the original is streaming contents, it is included in the count of a stream number.

When the contents are moved, there has already been known a technique in which a key dedicated to "move" is used instead of using the common key. Like the present embodiment, when Copy Count is inserted and the copy control information is transmitted as "move", a key dedicated to "move" or the CC key Kxcc described above may be used.

The characteristic point here is that the receiver (the transmitter&receivers A and B) can manage generation expectedly irrespective of whether it has an ability for interpreting information multiplexed into a contents stream, and only the apparatus capable of interpreting information multiplexed into a stream can make copies for the number indicated by Copy Count information. Accordingly, according to the present embodiment, a new function, that is the transfer of Copy Count information, can be added with minimum modification to known equipment.

Explained next is a technique in which the transmitter 1 manages Copy Count information and the number of steams. The example of FIG. 5 shows the case where the transmitter 1 has an enough number of copies, compared with the number of copies requested by the receiver. More specifically, it is the case where, for example, the contents to be transmitted from the transmitter 1 are allowable for 10 copies and a receiver makes a request for copies of the contents less than 10. When possibility is considered such that the receiver makes a request for copies of the contents more than 10 or a plurality of receivers simultaneously make a request for copies of the contents, the transmitter 1 requires appropriate control.

Copy Count may be newly defined as copy control information. That is, as shown in FIG. 6C, there is a method in which copy control information of a header portion 41 is newly defined as Copy Count and information on a copy allowable number (Copy Count #) is inserted into contents before encrypted.

Figure 6C:
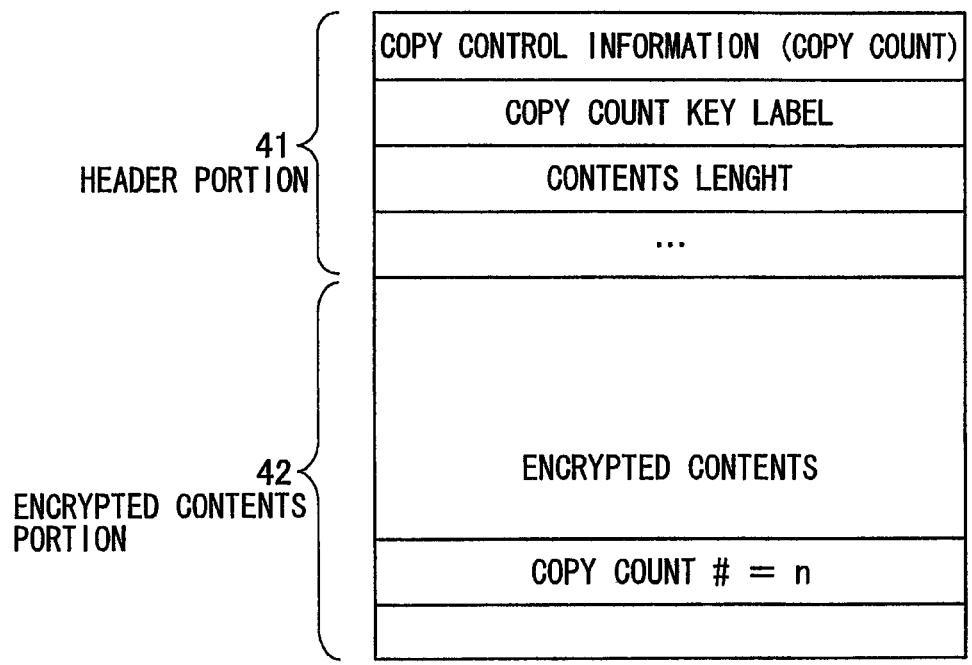
FIG. 6C is a view showing an example of a format of a packet in which information on a copy allowable number is inserted into contents before encrypted, with copy control information of a header portion 41 being newly defined as Copy Count.
Figure 6D:
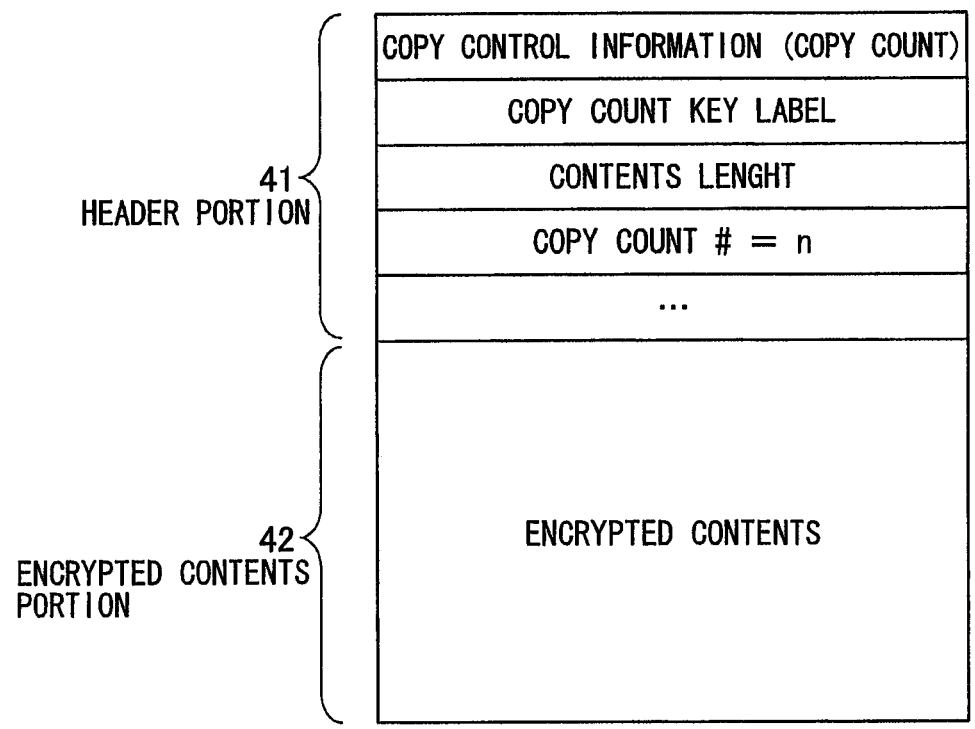
FIG. 6D is a view showing an example of a format of a packet in which information on a copy allowable number is indicated in another field of a header portion 41, with copy control information of the header portion 41 being defined as Copy Count.

Moreover, as shown in FIG. 6D, there is another method in which copy control information of a header portion 41 is newly defined as Copy Count and information on a copy allowable number is indicated in another field (Copy Count #) of a header portion 41.

In the case of both of FIGS. 6C and 6D, a transmitter&receiver (a conventional receiver) that does not know that copy control information is Copy Count cannot decrypt contents, thus handling of contents is impossible. In contrast, the format of FIG. 6D can provide the advantages described with respect to FIG. 7.

Figure 8:
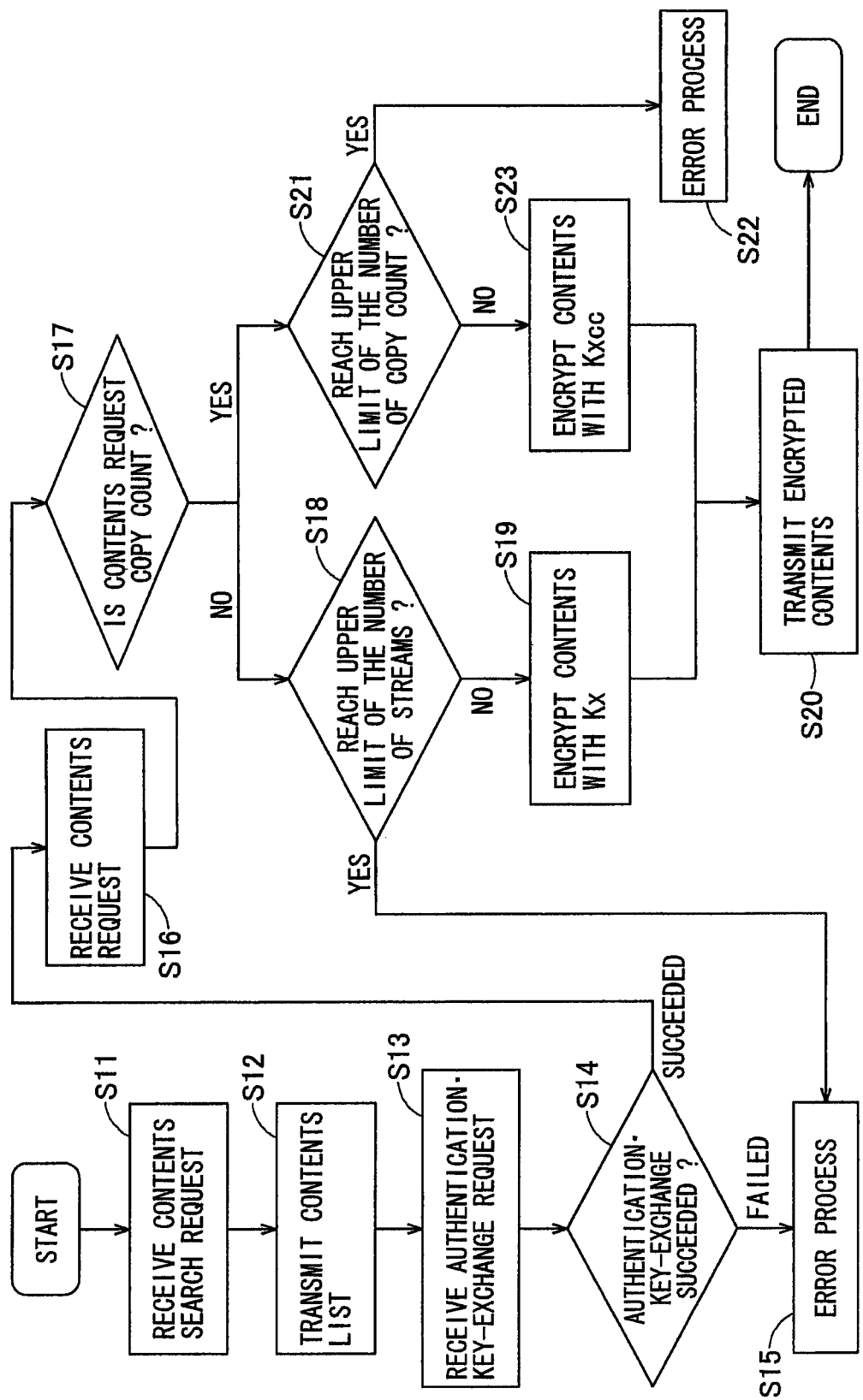
FIG. 8 is flowchart showing an example of process steps of a transmitter.

FIG. 8 is flowchart showing an example of process steps of the transmitter. As shown in FIG. 5, firstly, the transmitter receives a contents search request from the receiver over the connection A (step S11), and transmits a contents list in response to the request (step S12).

Thereafter, the transmitter receives an authentication•key-exchange request transmitted from the receiver over the connection B (step S13), to perform an authentication•key-exchange process. With a result of the authentication•key-exchange process, the transmitter determines whether the authentication•key-exchange process is succeeded (step S14). If the authentication•key-exchange process fails, the transmitter performs an error process (to transmit a message of failure to the receiver) (step S15), without performing the succeeding steps.

If the authentication•key-exchange process is succeeded, the transmitter encrypts a common key Kx and a CC key Kxcc with a common key used in the key-exchange process and transmits the encrypted keys to the receiver (not shown). If the receiver has no ability of decrypting the CC key Kxcc, the common key Kx is only transmitted.

Thereafter, the transmitter receives a contents request from the receiver (step S16), and determines whether the contents request is a Copy Count request (step S17). Here, the Copy Count request is a transmission request for contents allowable for copies of the number indicated by Copy Count information. The case where the request is not the Copy Count request indicates a conventional request such as Copy One Generation, Copy Never, and EPN (Encryption Plus Non-assertion).

If the request is not the Copy Count request, the transmitter checks whether the number of streams has reached a predetermined limited number (step S18). The predetermined limited number is the value set for each contents. For example, for Japanese digital broadcast contents, it is the value (8). If the number of streams has reached the predetermined limited number, the transmitter performs an error process, without performing contents transmission (step S15). If not reached to the limited number, the transmitter encrypts streaming contents with a common key Kx and transmits the encrypted streaming contents (steps S19 and S20).

Schemes that the receiver notifies the transmitter of information regarding the number of copies to be requested, for example, may be (1) to include the request or information in a URL and (2) to include the request or information in an HTTP Request Header.

If the transmitter receives a request for the number larger than the predetermined limited number from the receiver, the transmitter cannot transmit contents for that number. For this case, there are methods of (1) returning an error message without transmitting contents, (2) transmitting contents for a currently transmissible number, etc.

Concerning a request for copies, the number of copies may be set at a transmitter, in addition to at a receiver. There are methods for this case. For example, (1) a Copy Count number concerning the number of copies is preset at the transmitter in order to response to a Copy Count request from the receiver. (2) A the transmitter indicates a URL unique to each number of contents even if the same contents to the receiver, and the receiver selects the URL corresponding to a desired number of contents to receive and transmits an HTTP GET Request to the URL.

In the case of a Copy Count request, the transmitter determines whether the number of copies requested has reached a predetermined limited number (step S21). The predetermined limited number is the value set for each streaming contents.

If the number of copies requested has reached the predetermined limited number, the transmitter performs an error process without performing stream contents transmission (step S22). If not reached to the limited number, the transmitter encrypts streaming contents with a CC key Kxcc and transmits the encrypted streaming contents (steps S23 and S20).

Even if the number of copies requested has reached the predetermined limited number, contents may be transmitted by decreasing a Copy Count number of an already transmitted stream to be smaller than the limited number in total. The characteristic point here is that the process is separated for each of the types of requested streaming contents. Conventionally, check for the number of streams has been only performed irrespective of the types of streaming contents. On the contrary, in the present embodiment, in the case of a Copy Count request, it is only determined that the number of copies has reached the upper limit of Copy Count. In the case of a request other than the Copy Count request, it is only determined that the number of streams has reached the upper limit without Copy Count check. The present embodiment is also different from a known transmitter on this characteristic point.

The predetermined limited number is a value decided for each streaming contents. In contrast, the number of copies made for the streaming contents 5 is a value dynamically varying. For example, it is considered to transmit streaming contents that is allowable for an X number of copies. It is defined that X>M+N. When the same streaming contents are simultaneously transferred to receivers A and B from a transmitter, the number of copies to be transmitted to the receivers A and B are M and N, respectively. If the receiver A suspends the transfer of streaming contents, the transmitter can transfer the M number of new copies to the receiver B or another receiver. Accordingly, the transmitter has to dynamically manage the number of copies now transmitted.

Figure 9:
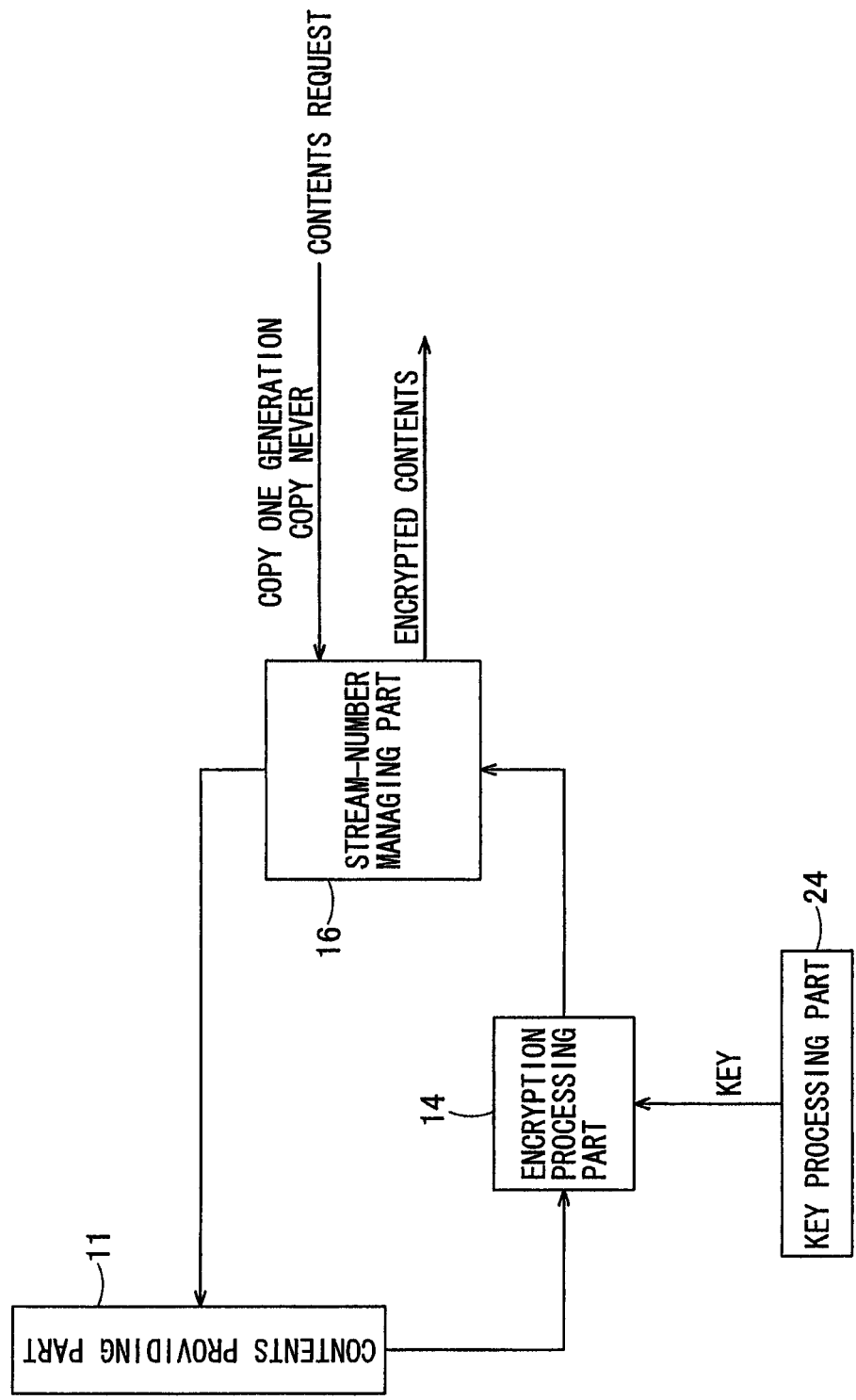
FIG. 9 is a view showing schematic configuration of a comparative example of a transmitter.

FIG. 9 is a view showing schematic configuration of a comparative example of the transmitter. Shown in FIG. 9 is the configuration of the parts in the transmitter related to the management of Copy Count and the number of streams. The transmitter of FIG. 9 has a stream-number managing part 16, a key processing part 24, a contents providing part 11, and an encryption processing part 14.

The stream-number managing part 16 counts the number of connection now in communication. The key processing part 24 manages a common key Kx. The contents providing part 11 provides contents. The encryption processing part 14 performs encrypts the contents provided from the contents providing part 11 using a key provided by the key processing part 24.

On receiving a contents request from the receiver, the transmitter of FIG. 9 checks the number of streams now used for contents transmission. The transmitter rejects the contents request if the number of streams is larger than a threshold value. If it is smaller than the threshold value, the number of streams managed by the stream-number managing part 16 is increased by one. The contents providing part 11 is instructed to transmit contents. The contents providing part 11 then instructs the encryption processing part 14 to encrypt the contents. The key processing part 24 provides a common key Kx under management to the encryption processing part 14. Then, the encryption processing part 14 encrypts the contents using the common key Kx.

If the connection now transmitting encrypted contents is interrupted, the stream-number managing part 16 decreases the number of streams it manages by one.

As described above, the known transmitter only has a function of managing the number of streams simply.

Figure 10:
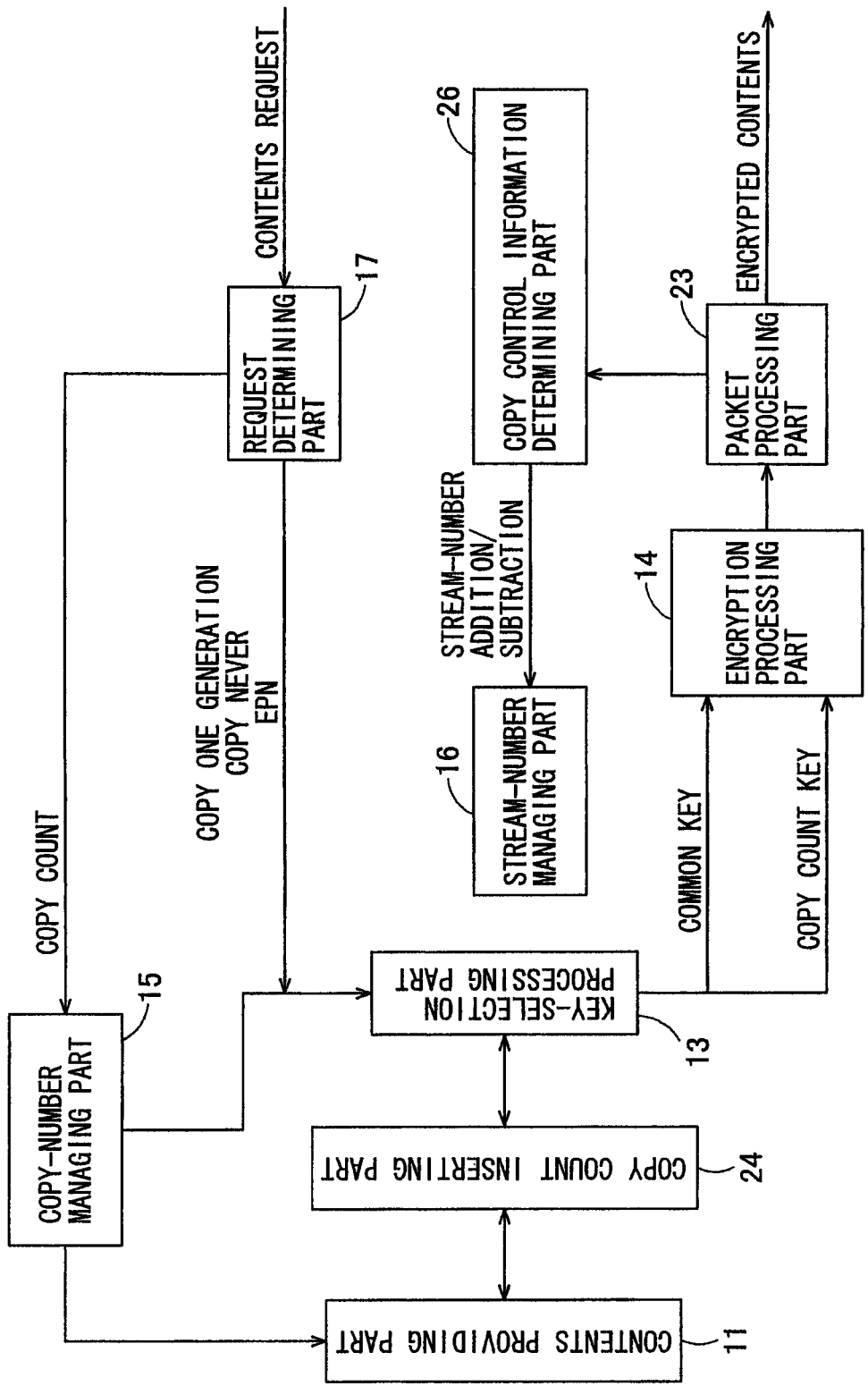
FIG. 10 is a view showing schematic configuration of main parts of a transmitter according to a first embodiment.

FIG. 10 is a view showing the schematic configuration of main parts of the transmitter according to a first embodiment. Like FIG. 9, FIG. 10 shows the configuration of the parts in a transmitter related to the management of Copy Count and the number of streams. That is, FIG. 10 shows some parts of the internal configuration of the transmitter of FIG. 3 in more detail.

Compared with the transmitter of FIG. 9, the transmitter of FIG. 10 is newly added with a copy-number managing part 15, a request determining part 17, a Copy Count inserting part 24, and a copy control information determining part 26, with a key-selection processing part 13 instead of the key processing part 24.

The request determining part 17 performs a process of determining whether control is performed by the stream-number managing part 16 or the copy-number managing part 15 in accordance with a request from the receiver. If a request from the receiver is a request for making a plurality of copies of contents, the copy-number managing part 15 performs processing control. If the request from the receiver is copy control information other than the request described above, the stream-number managing part 16 performs processing control.

The copy-number managing part 15 manages a copy total number that indicates how many copies are now transmitted for each contents. The Copy Count inserting part 24 inserts Copy Count information into contents.

The key-selection processing part 13 selects the CC key for the request for making a plurality of copies whereas selects a common key for another request. The encryption processing part 14 encrypts the contents in accordance with the specified key.

The copy control information determining part 26 determines whether a packet generated by the packet processing part 23 includes copy control information with which the stream-number managing part 16 should manage the number of streams. More specifically, the copy control information determining part 26 determines that the number of steams should be managed by the stream-number managing part 16 if the copy control information is Copy One Generation, Copy Never or EPN, and notifies the stream-number managing part 16.

In the case of transferring streaming contents with "move" applied to copy control information, the copy control information determining part 26 determines that the number of steams should be managed by the stream-number managing part 16 if the copy control information is "move".

When it is determined that the copy control information determining part 26 has to manage the number of streams, the stream-number managing part 16 manages the increase and decrease of the number of streams. That is, when a new connection is established for transmission of newly encrypted contents, the copy control information determining part 26 increases the number of streams and checks whether it has reached the upper limit. If the connection is terminated by completion of transmission of encrypted contents, the copy control information determining part 26 decreases the number of streams.

As a technique for detecting the cut-off of a connection, there are, for example, the following (1) and (2).

(1) The transmitter receives a connection interruption request transmitted from a receiver and the packet processing part 23 halts the transmission of packets to the network interface processing part 22.

(2) The packet processing part 23 receives an error massage from the network interface processing part 22 due to communication disturbance and on receiving the message, the packet processing part 23 halts the transmission of packets to the network interface processing part 22.

Figure 11:
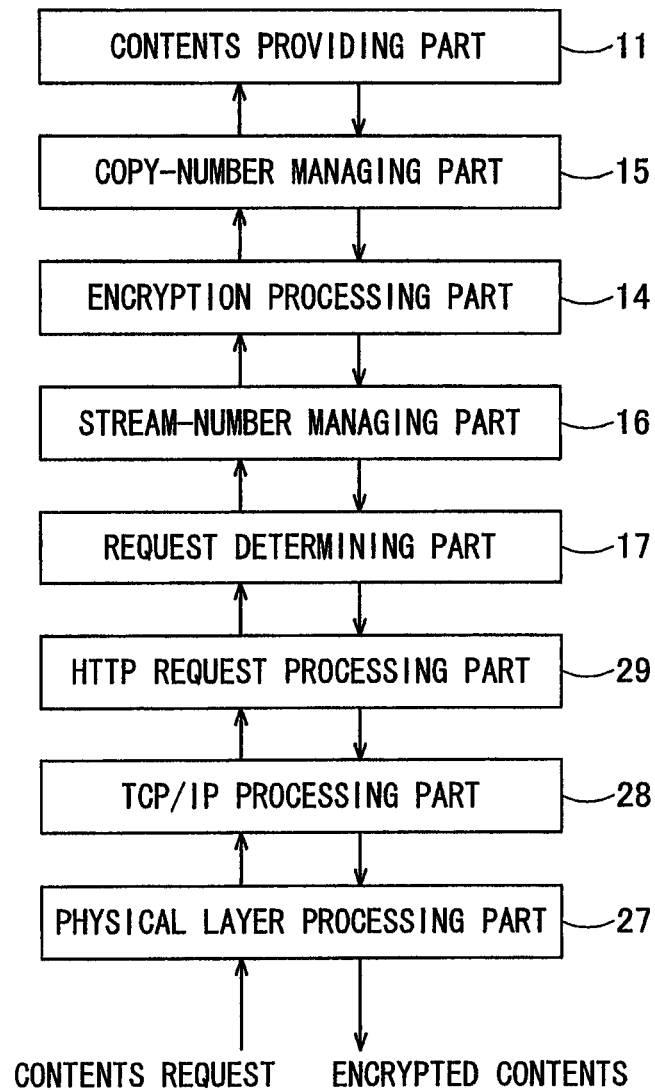
FIG. 11 is a view explaining each part of FIG. 10 in relation to a layer structure in an OSI model.

FIG. 11 is a view explaining each part of FIG. 10 in association with a layer structure in an OSI (Open Systems Interconnection) model. FIG. 11 shows that the lower side of FIG. 11 is processed by a lower layer close to a physical layer and the upper side is processed by an upper layer close to an application layer. In FIG. 11, a physical layer processing part 25 performs the process of the physical layer of the network. A TCP/IP processing part 26 performs a process of TCP/IP. An HTTP Request processing part 27 performs a process of an HTTP Request transmitted from the receiver. The processes of the physical layer processing part 25, the TCP/IP processing part 26, and the HTTP Request processing part 27 are performed in the network interface processing part 22 of FIG. 3.

The request determining part 17 confirms a URL or an HTTP Header of an HTTP Request to determine whether a contents request is a request for making a plurality of contents. As shown in FIG. 11, from the lower side to the upper side of the network layer, the processes are performed by the request determining part 17, the stream-number managing part 16, the encryption processing part 14, the copy-number managing part 15, and the contents providing part 11 in order.

One of the features in FIGS. 10 and 11 is that the process of the copy-number managing part 15 is performed before the process of the encryption processing part 14 and the process of the stream-number managing part 16 is performed in parallel with the process of the encryption processing part 14.

The reason why the process of the copy-number managing part 15 is performed before the process of the encryption processing part 14 is that an encryption key used by the encryption processing part 14 for the purpose of encrypting contents is generated using management information on the number of copies.

In FIG. 11, from the bottom to the above, the stream-number managing part 16, the encryption processing part 14, and the copy-number managing part 15 are aligned in order. Each of the processes of the copy-number managing part 15 and the stream-number managing part 16 corresponds to the process of the application layer defined in an OSI model. However, the copy-number managing part 15 performs the process without using the information regarding the status of the network, whereas the stream-number managing part 16 performs the process while monitoring the status of the network.

As described above, the transmitter of the first embodiment changes the process of determining whether to transfer contents depending on the type of a copy request from the receiver. That is, when there is a contents transfer request for making multiple copies, the transmitter manages the number of copies for each contents, and manages an upper limit of the number of copies so that the number of copies does not exceed a specific number. When contents with the other copy control information (Copy One Generation, Copy Never or EPN) are transferred, an upper limit of the number of streams is managed so that contents do not pass a predetermined number of connections or more irrespective of the contents. Moreover, the transmitter of the first embodiment changes a key for encrypting contents depending on the type of a copy request. That is, for contents making a plurality of copies, the transmitter encrypts the contents with a different key (CC key) for each receiver. In contrast, when transferring contents with the other copy control information, the transmitter encrypts the contents with a common key shared by a plurality of receivers.

Accordingly, it is possible to correctly transmit information for making a plurality of copies to a receiver and also transmit contents using conventional copy control information.

Moreover, in the first embodiment, the process of the copy-number managing part 15 is performed before the process of the encryption processing part 14 and the process of the stream-number managing part 16 is performed in parallel with the process of the encryption processing part 14. Therefore, the encryption processing part 14, the copy-number managing part 15, and the stream-number managing part 16 can be separately designed, thereby simplifying implementation and reducing cost of design and development.

SECOND EMBODIMENT

Explained in the first embodiment is the example in which the transmitter does not have a storage function. In contrast, a second embodiment which will be described below has a feature that the transmitter has a storage function with which streaming contents can be stored in the transmitter. Another feature is that Copy Count information can be inserted into streaming contents received via a broadcast wave and transmitted over a network.

It should be noted here that the restriction on the number of streams is not applied to stored contents. That is, when transmitting stored contents, it is unnecessary to manage the number of streams. For management of the number of copies, the first embodiment requires management so that the total number of copies output to a network does not exceed a predetermined limited number. In the second embodiment, the number of copies has to be managed so that the total number of the number of copies output to a network and the number of copies to be stored does not exceed a predetermined limited number. These are the characteristic points of the second embodiment different from the first embodiment.

A transmitter according to the second embodiment has a storage function and the receiver has a function of transmitting streaming contents of a broadcast wave now on air to a network, a function of storing the streaming contents in a hard disk using a storage function, and a function of transmitting stored contents to a network in order to reproduce the stored contents.

Figure 12:
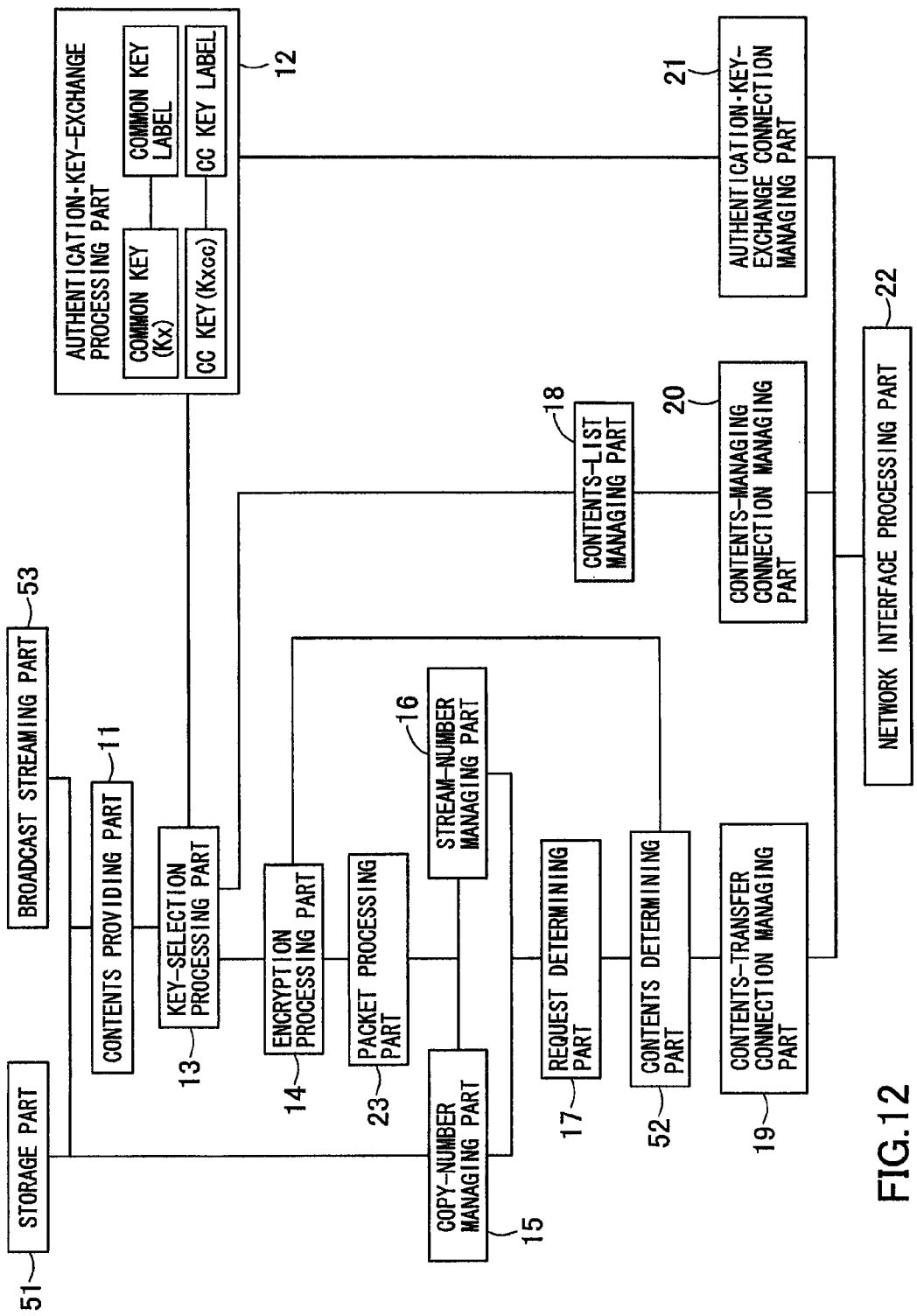
FIG. 12 is a block diagram showing an example of the internal configuration of a transmitter according to a second embodiment.

FIG. 12 is a block diagram showing an example of the internal configuration of the transmitter according to a second embodiment. The transmitter of FIG. 12 has a storage part 51, a contents determining part 52, and a broadcast streaming part 53, in addition to the configuration of FIG. 2. The storage part performs a process of storing contents, a process of outputting the stored contents for reproduction, etc. The reason for providing the broadcast streaming part 53 in addition to the contents providing part 11 is that streaming contents received at the broadcast streaming part 53 and contents stored in the storage part 51 are both input to the contents providing part 11 of the present embodiment.

When the transmitter stores a received broadcast wave, restriction is required so that only the transmitter which received the broadcast wave can decrypt and playback it. Generally, a key whose value is unique to the transmitter is given to the transmitter for encrypting contents.

An encryption algorism to be used by the encryption processing part 14 may be different between the case to be stored and the case to be output to a network. For example, streaming contents acquired by the broadcast streaming part 53 is encrypted by the encryption processing part 14 with a key unique to a transmitter (a stored-contents encryption key Kx1, hereinafter) selected by the key-selection processing part 13, as described later.

At this case, attention is necessary for management of the number of copies. As described above, the total number of the number of copies stored in the transmitter and the number of copies output to the network indicated by Copy Count information has to be smaller than a predetermined limited number. Therefore, the copy-number managing part 15 has to manage the number of copies stored by the storage part 51 and a copy allowable number included in Copy Count information to be transmitted to the receiver.

The contents determining part 52 determines whether the requested contents are the stored contents so that the key-selection processing part 13 can select a key for decrypting. In the case of outputting the stored contents for the purpose of playback, that is, in the case of outputting the stored contents as No More Copies, there is no need to manage connections and the number of copies. However, a stored-contents encryption key Kx1 has to be used to decrypt the contents.

The foregoing is summarized as follows. When the transmitter has a function of storing streaming contents, the transmitter encrypts contents with any key selected among three keys that are a common key Kx and a CC key Kxcc, and in addition, a stored-contents encryption key Kx1. The transmitter has to use different keys depending on how to transmit which contents.

Figure 13:
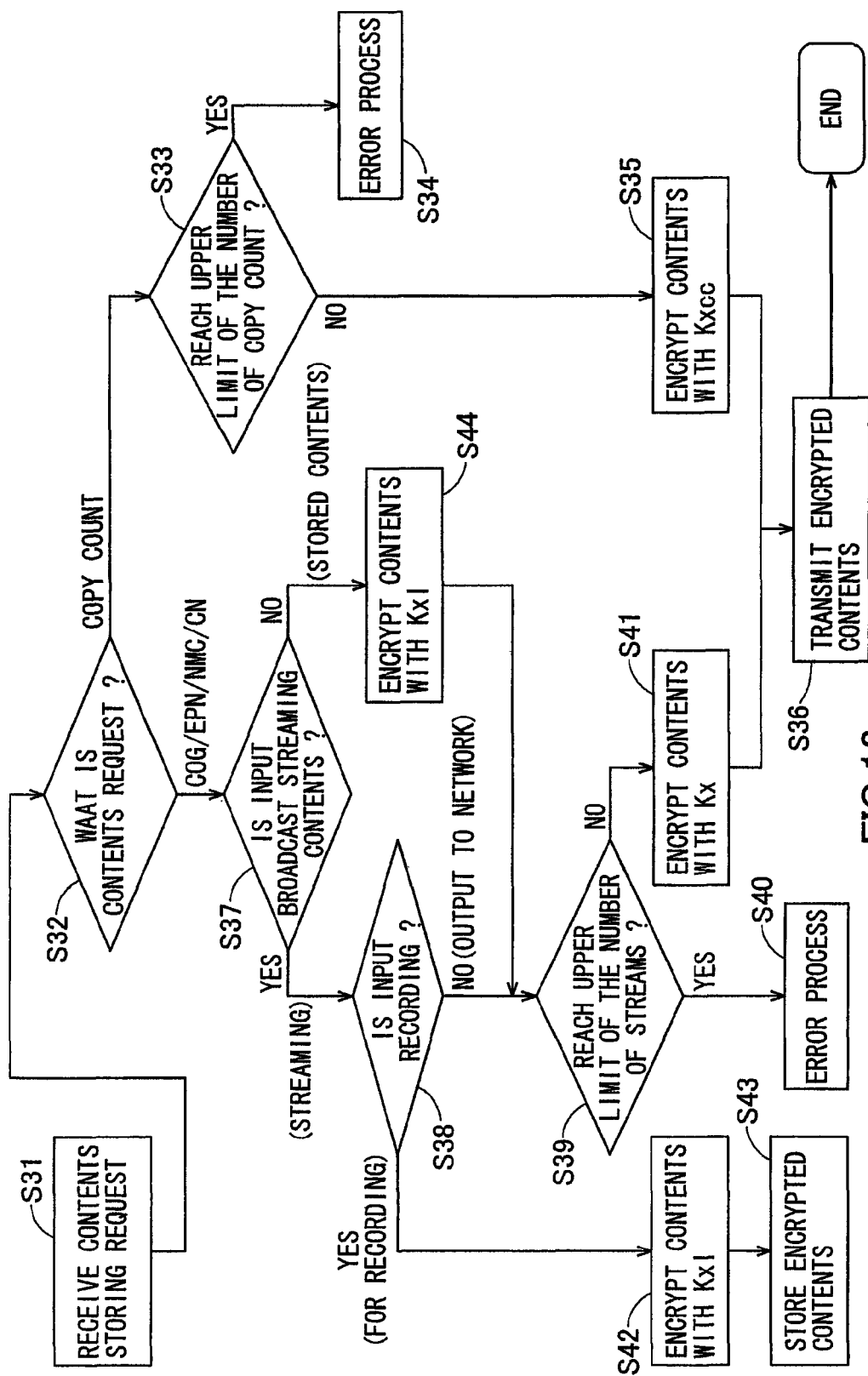
FIG. 13 is a sequence diagram showing an example of operational steps of a contents transmitting system according to the second embodiment.

FIG. 13 is a sequence diagram showing an example of operational steps of a contents transmitting system according to the second embodiment.

The process of the transmitter until the reception of a contents request (steps S11 to S15 of FIG. 8) is the same as the first embodiment, and hence omitted in FIG. 13. FIG. 13, in addition to the process of FIG. 8, has a process of determining the type of a contents request and whether contents of the request are streaming contents or a contents recording request determining process.

On receiving a contents transmission request from the receiver (step S31), the type of the contents transmission request is determined (step S32). If the type is a Copy Count request, like shown in FIG. 8, it is checked whether a Copy Count number has reached a predetermined limited number (step S33). If reached, an error process is performed (step S34). If not reached predetermined limited number, contents are encrypted with the CC key Kxcc (or a move key if copy control information is "move" and the move key is used), and the encrypted contents are transmitted (steps S35 and S36).

If determined in step S32 that the type of the contents transmission request is COG (Copy One Generation), EPN (Encryption Plus Non-assertion), NMC (No More Copies) or CN (Copy Never), it is determined whether the contents of the request are broadcast streaming contents (step S37). Here, the broadcast streaming contents are not contents already stored but contents for which a broadcast wave now in reception is transmitted as it is. The stored contents are marked as No More Copies. Copy control information for use in playback of the stored contents may be No More Copies or EPN. Copy control information for broadcast streaming contents may be Copy Never, EPN or Copy One Generation.

If copy control information is "move", generally, the stored contents are a target. However, as explained in the first embodiment, when transferring streaming contents with copy control information "move", since there is a possibility of either one of streaming contents or stored contents even in the case of "move", the receiver has to make determination depending on contents to be requested, not on copy control information.

If determined as broadcast streaming contents in step S37, it is determined whether the receiver requests the recording of the contents (step S39). If the receiver does not request the recording, it is determined whether the number of the streams have reached the upper limit (a predetermined limited number) (step S39). If reached the upper limit, an error process is performed (step S40).

If not reached the upper limit, broadcast streaming contents are encrypted with a common key Kx (step S41).

If it is determined in step S38 that the receiver is making a request for recording broadcast streaming contents, broadcast streaming contents are encrypted with a stored-contents encryption key Kx1l (step S42), and the encrypted contents are stored in a recording apparatus such as an HDD (step S43).

Figure 14:
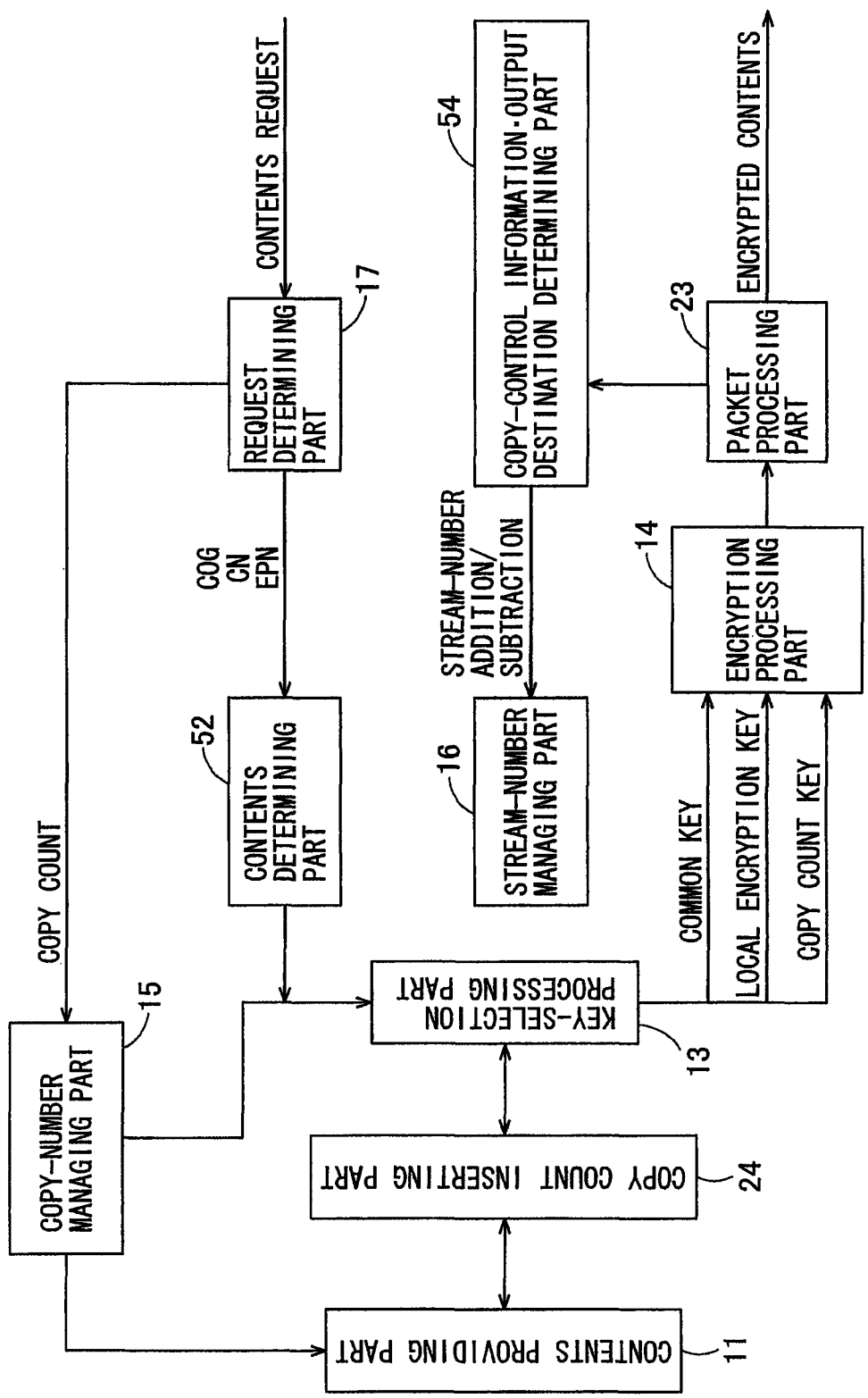
FIG. 14 is a view showing schematic configuration of main parts of a transmitter according to the second embodiment.

FIG. 14 is a view showing schematic configuration of main parts of the transmitter according to the second embodiment. FIG. 14 shows only the configuration relating to the management of Copy Count and the number of streams, like FIG. 10.

The transmitter of FIG. 14 has, in addition to the configuration of FIG. 10, a contents determining part 52 and a copy-control information•output destination determining part 54 instead of the copy control information determining part 26.

The contents determining part 52 determines whether the contents requested by the receiver are broadcast streaming contents or stored contents.

As described above, in the second embodiment, a stored-contents encryption key Kx1 is used for encrypting stored contents whereas a common key Kx is used for encrypting broadcast streaming contents. The contents determining part 52 notifies the key-selection processing part 13 of which key should be used for encrypting contents.

The copy-control information•output destination determining part 54 determines whether to manage the number of streams based on a contents output destination and copy control information.

Management of the number of streams is not performed in the second embodiment when the stored contents are outputted. Therefore, when the copy-control information•output destination determining part 54 determines that the contents are broadcast streaming contents and it includes copy control information except for Copy Count request, the stream-number managing part 16 manages the number of streams but the copy-number managing part 15 does not manage the number of copies. In contrast, when the copy-control information•output destination determining part 54 determines that the contents are the stored contents or broadcast streaming contents and it includes a Copy Count request, the copy-number managing part 15 manages the number of copies but the stream-number managing part 16 does not manage the number of streams.

When copy control information indicates "move", the stored contents are a target in general. However, as explained in the first embodiment, when the streaming contents are transferred with copy control information "move", even if it is "move", there is a possibility of either streaming contents or stored contents. Therefore, determination of whether to manage the number of streams cannot be made by copy control information only. A method for solving this problem may be (1) a key-selection processing part notifies a copy-control information•output destination determining part 54 of information indicating whether streaming contents or stored contents with a key label and the copy-control information•output destination determining part make determination in accordance with a key label of a stream, (2) when "move" is performed to stored contents, a "move" dedicated key is used, whereas when "move" is performed to streaming contents, a CC key Kxcc is used with detection of the type of contents by a key label, (3) a header portion is provided with a field for distinguishing stored contents from streaming contents, and the field is referred to specify the stored contents or the streaming contents. For a Copy Count request, the number of copies is requested to the copy-number managing part 15 to confirm whether the number of copies does not exceed a predetermined limited number. If smaller than the predetermined limited number, the key-selection processing part 13 is notified to use a stored-contents encryption key (Kx1) as a key for recording the contents and the encryption processing part 14 encrypts the contents with the given stored-contents encryption key (Kx1).

As explained above, according to the second embodiment, the transmitter having a storage function performs, not only the storage of streaming contents, but also the transmission of streaming contents to a network and the management of the number of copies. When the transmitter transmits streaming contents, the transmitter does not manage the number of connections in the case where the contents to be transmitted is stored contents or it is a live broadcast stream including Copy Count information. In contrast, if it is a live broadcast stream without Copy Count information, the transmitter restricts the number of connections. Moreover, the transmitter encrypts contents by selectively using a stored-contents encryption key for use in storage, a CC key, and a common key.

Accordingly, the storage of broadcast contents, the transmission to a network, and the transmission of stored contents to a network can be appropriately managed.

Explained in the embodiments described above is the transfer of broadcast streaming contents. In the embodiments, however, the reception of a broadcast waves is not only considered. The embodiments are also applicable to the reception and delivery of streaming contents provided via the Internet.

At least part of the transmitter explained in the embodiments may be configured with hardware or software. When it is configured with software, a program that performs at least part of the functions of the transmitter may be stored in a storage medium such as a floppy (a registered trademark) disk and CD-ROM, and then installed in a computer to run thereon. The storage medium may not be limited to a detachable one such as a magnetic disk and an optical disk but may be a standalone type such as a hard disk drive and a memory.

Moreover, a program that achieves the function of at least part of the transmitter may be distributed via a communication network (including wireless communication) such as the Internet. The program may also be distributed via an online network such as the Internet or a wireless network, or stored in a storage medium and distributed under the condition that the program is encrypted, modulated or compressed.

The invention claimed is:

1. An information processing apparatus, comprising:
a key transmitting part configured to encrypt a first key and a second key by using a common key and to transmit the common key to a communicating apparatus, the common key being generated by performing an authentication key exchange process with the communicating apparatus, the first key having a value unique to the communicating apparatus, the second key having a value common to a plurality of communicating apparatuses;
a key label transmitting part configured to transmit first key information corresponding to the first key and second key information corresponding to the second key;
a request determining part configured to determine a request type for streaming contents from a communicating apparatus;
a copy number managing part configured to manage a number of copies permissible for the communicating apparatus, if it is determined that the communicating apparatus has requested by using the first key information, reception of streaming contents encrypted by the first key;
a key-selection processing part configured to select the first key corresponding to transfer of streaming contents permissible for one or more of copies and the second key corresponding to transfer of streaming contents for copies with generation management restriction or not permissible for copies, based on a result of determination of the request determining part;
an encryption processing part configured to generate encrypted streaming contents using the first or the second key;
a packet processing part configured to generate a stream that includes plain text key information selected by the key-selection processing part and plain text information on the number of copies if the key-selection processing part has selected the first key and encrypted streaming contents,
a contents-managing connection managing part configured to manage a first connection to the communication apparatus for transferring management information on streaming contents;
an authentication key-exchange connection managing part configured to manage a second connection to the communication apparatus for the authentication key-exchange process; and
a contents-transfer connection managing part configured to manage a third connection to the communicating apparatus for streaming contents transfer, the contents-transfer connection managing part configured to transfer information on the number of copies,
wherein when the stream including information on the number of copies is transmitted, the stream comprises a plain text header comprising copy control information and the key information, in addition to the encrypted streaming contents encrypted by using information of the number of copies and the first key.

2. The information processing apparatus of claim 1, further comprising:
a contents request processing part configured to determine either of a streaming contents reception request for rendering or a streaming contents reception request for one or more copies by information included in an HTTP header; and
a key selection processing part configured to encrypt streaming contents by using the first key when the contents request processing part determines to be the streaming contents reception request for one or more copies.

3. The information processing apparatus of claim 1, further comprising:
a stream number managing part configured to manage a number of streams now in communication, if it is determined that the communicating apparatus has requested by using the second key information, reception of streaming contents encrypted by the second key, and to make stop transfer of streaming contents if the number of streams now in communication exceeds a predetermined threshold value; and
a copy-control information determining part configured to determine whether the stream includes copy control information indicating that the stream number managing part manages the number of streams, wherein the stream number managing part manages the number of streams, based on a result of determination of the copy-control information determining part.

4. The information processing apparatus of claim 1, wherein
the first key is selected by the key-selection processing part when the information on the number of copies is included in the stream and streaming contents are transmitted using "move" as copy control information.

5. The information processing apparatus of claim 1, further comprising:
a storage part configured to store streaming contents encrypted with a third key unique to the information processing apparatus; and
a contents determining part configured to determine whether streaming contents requested by the communicating apparatus are streaming contents stored in the storage part or streaming contents before being stored, wherein
the key-selection processing part selects the first, the second, or the third key, and the encryption processing part generates encrypted streaming contents by encrypting the streaming contents with the first, the second, or the third key.

6. The information processing apparatus of claim 1, wherein:
- a process of the copy number managing part is performed before a process of the encryption processing part is begun; and
- a process of the stream number managing part is performed in parallel with a process of the encryption processing part.

7. The information processing apparatus of claim 4, wherein
the second key is selected when the communicating apparatus transmits streaming contents by using copy control information of Copy Never or EPN (Encryption Plus Non-assertion: Internet retransmission prohibited) or using copy control information of Copy One Generation without including the information on the number of copies in the stream.

\* \* \* \* \*